US012722896B2

(12) United States Patent
Hagenbuch et al.

(10) Patent No.: US 12,722,896 B2
(45) Date of Patent: Sep. 1, 2026

(54) SYSTEM FOR RECEIVING, LOADING, QUEUING, AND DELIVERY OF GOODS

(71) Applicant: Franke Technology and Trademark Ltd, Hergiswil (CH)

(72) Inventors: Alex Hagenbuch, Spring Hill, TN (US); Richard Seiss, Mount Juliet, TN (US); Gregory Richards, Deerfield, IL (US); Christian Mathesius, Brentwood, TN (US)

(73) Assignee: Franke Technology and Trademark Ltd, Hergiswil (CH)

( * ) Notice: Subject to any disclaimer, the term of this patent is extended or adjusted under 35 U.S.C. 154(b) by 56 days.

(21) Appl. No.: 18/832,193

(22) PCT Filed: Jan. 26, 2023

(86) PCT No.: PCT/EP2023/051845
§ 371 (c)(1),
(2) Date: Jul. 23, 2024

(87) PCT Pub. No.: WO2023/151955
PCT Pub. Date: Aug. 17, 2023

(65) Prior Publication Data

US 2025/0100802 A1 Mar. 27, 2025

Related U.S. Application Data

(60) Provisional application No. 63/307,714, filed on Feb. 8, 2022.

(51) Int. Cl.
*B65G 1/137* (2006.01)
*B65G 43/10* (2006.01)
(Continued)

(52) U.S. Cl.
CPC ........... *B65G 1/1376* (2013.01); *B65G 43/10* (2013.01); *B65G 47/57* (2013.01); *B65G 47/61* (2013.01); *B65G 2201/0202* (2013.01)

(58) Field of Classification Search
None
See application file for complete search history.

(56) References Cited

U.S. PATENT DOCUMENTS 5,113,970 A 5/1992 Bavis
7,708,135 B2 * 5/2010 Ellerth .................... A47F 10/06 198/801

FOREIGN PATENT DOCUMENTS

EP 3053860 B1 9/2018
WO 2019166480 A1 9/2019

OTHER PUBLICATIONS

Franke Technology: "Bag & Clip Transporter System", YouTube Nov. 19, 2018 (Nov. 19, 2018), XP093041861, Retrieved from the Internet: URL:https://www.youtube.com/watch?v=sSFQTd J9OIU, [retrieved on Apr. 13, 2023].

* cited by examiner

*Primary Examiner* — Gene O Crawford
*Assistant Examiner* — Amari J Meddling
(74) *Attorney, Agent, or Firm* — Volpe Koenig

(57) ABSTRACT

A system for loading, queueing, and delivery of orders is provided having a controller, a transport arrangement including a pathway defined by a track, with a plurality of cars guided on said track, and a loading station and an unloading station located along the pathway. Carrier racks are attached to the cars to deliver orders from the loading station to the unloading station. The unloading station includes powered fingers to remove the orders from the carrier racks and deliver them to an offload and delivery sequencing arrangement that includes at least one sequential
(Continued)

parking conveyor that can accumulate orders or batches of product prior to delivery from a present station to a customer pick-up location. This provides a flexible design of layouts for moving food products in any direction, horizontally or vertically, from inside a restaurant to a second drive-thru lane adjacent to the first lane, at distance to the restaurant building.

24 Claims, 18 Drawing Sheets

(51) Int. Cl.
*B65G 47/57* (2006.01)
*B65G 47/61* (2006.01)

93
106A
106B
106C
120
C
OFFLOAD
PARKING #1
PARKING #2
PARKING #3
PRESENT
98
92
104A
102A
104B
102B
104C
102C
116
114

ORDER 1 (1 OF 1)
14

93
OFFLOAD
92
106A
ORDER 2 (2 OF 2)
15.2
PARKING #1
102A
106B
PARKING #2
102B
106C
ORDER 2 (1 OF 2)
15.1
PARKING #3
102C
120
ORDER 1 (1 OF 1)
14
PRESENT
114

93
OFFLOAD
92
106A
PARKING #1
102A
106B
ORDER 2 (2 OF 2)
15.2
15
PARKING #2
102B
106C
ORDER 2 (1 OF 2)
15.1
PARKING #3
102C
120
ORDER 1 (1 OF 1)
14
PRESENT
114

93
ORDER 3 (1 OF 2)
16.1
OFFLOAD
92
106A
PARKING #1
102A
106B
ORDER 2 (2 OF 2)
15.2
15
PARKING #2
102B
106C
ORDER 2 (1 OF 2)
15.1
PARKING #3
102C
120
ORDER 1 (1 OF 1)
14
PRESENT
114

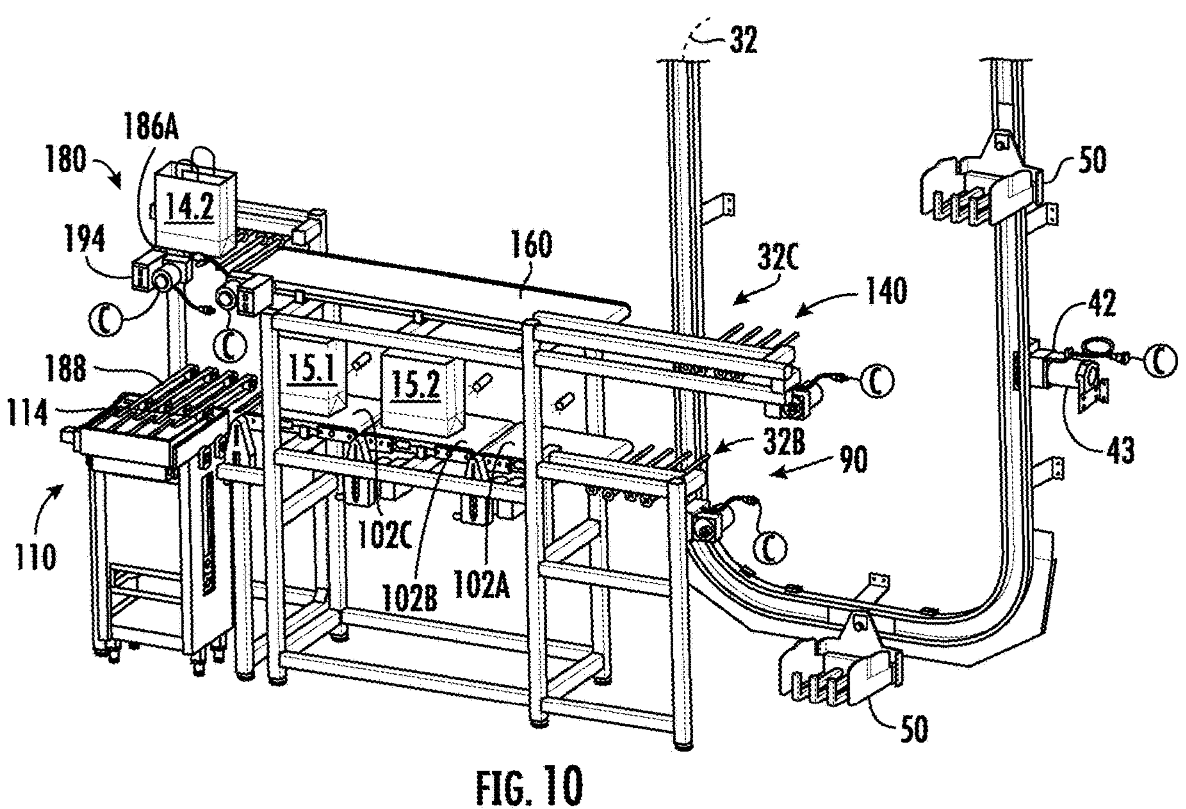
FIG. 10
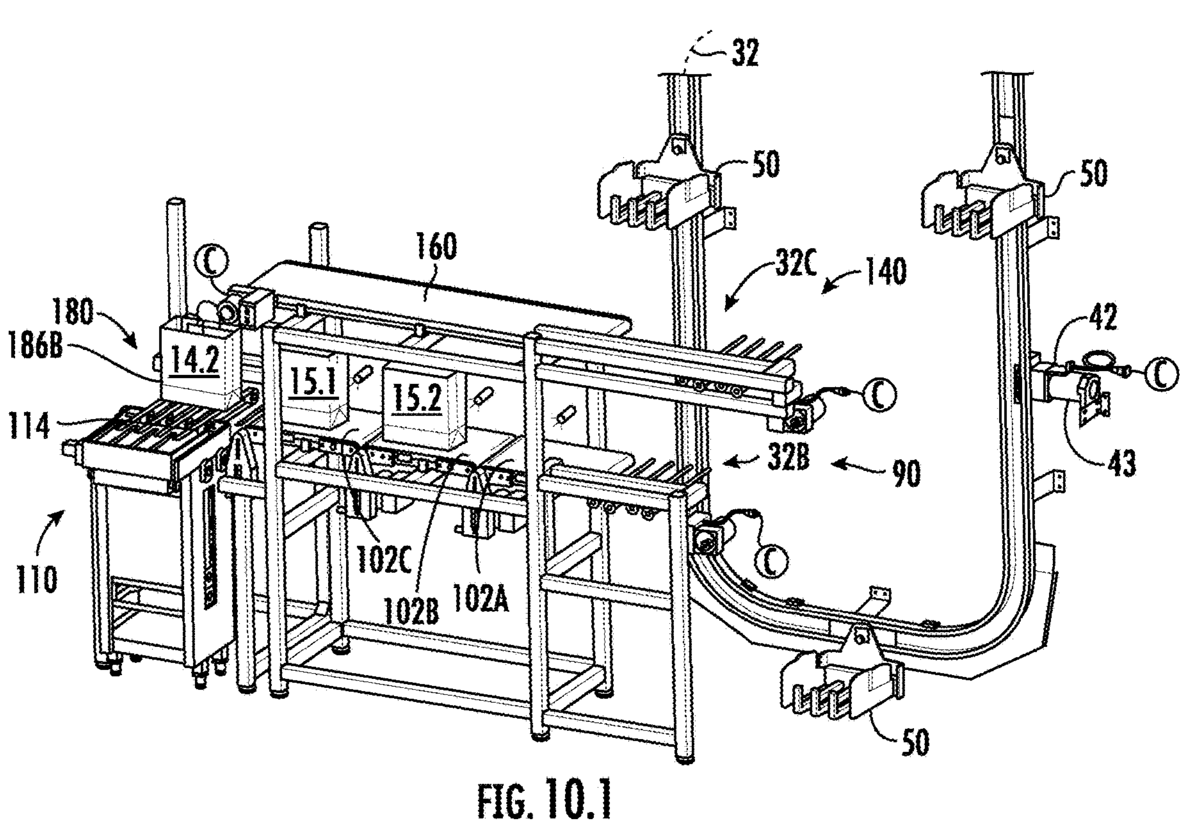
FIG. 10.1

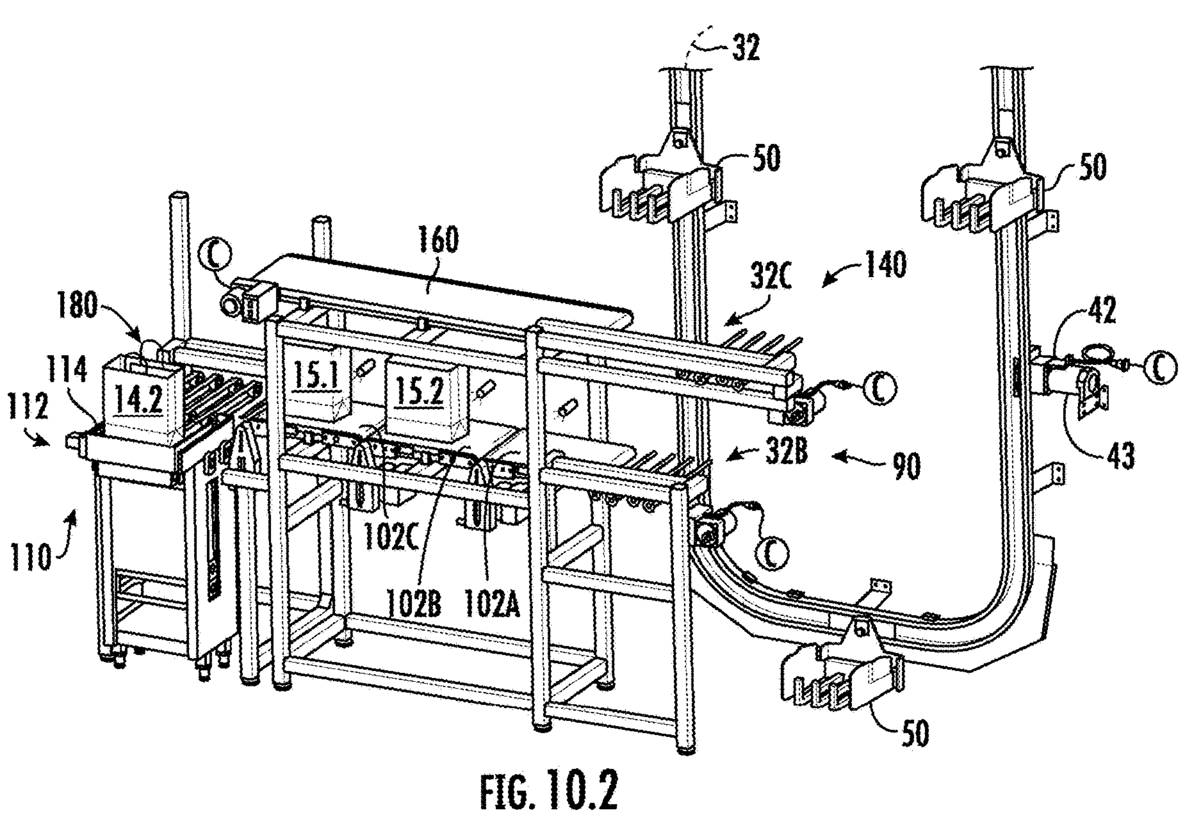
FIG. 10.2
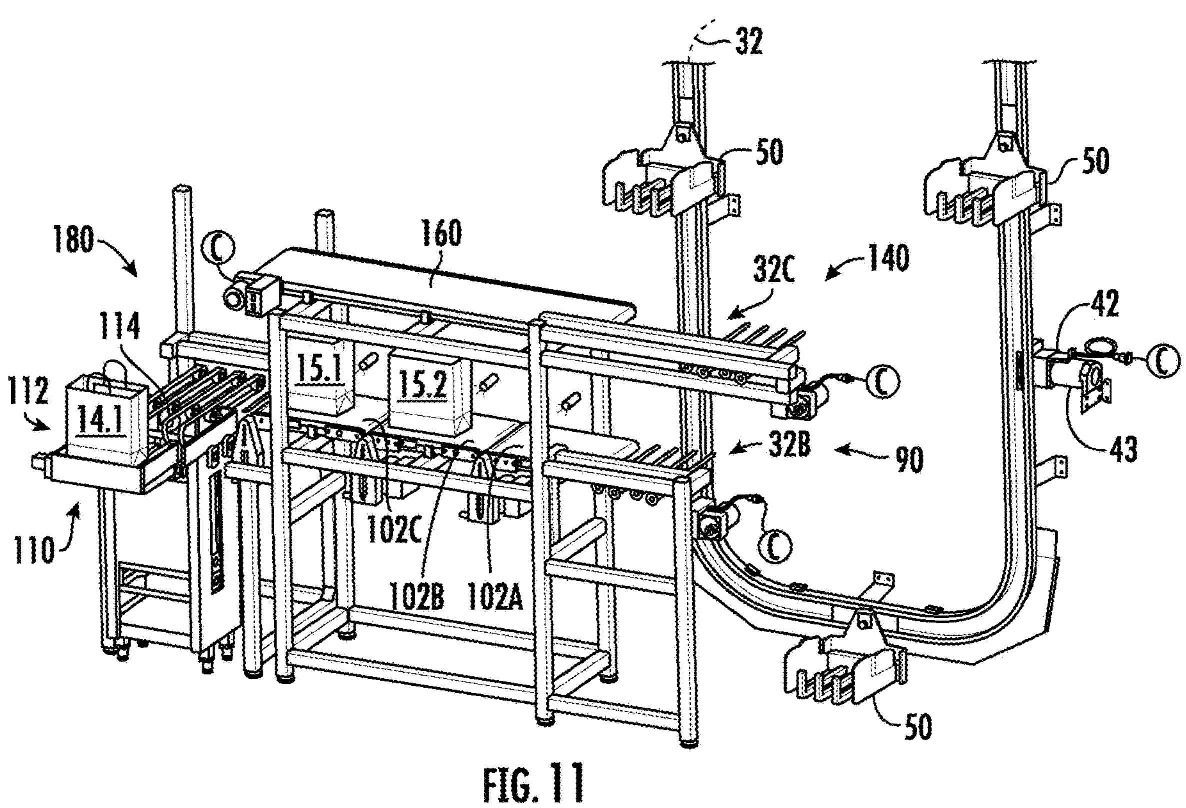
FIG. 11

SYSTEM FOR RECEIVING, LOADING, QUEUING, AND DELIVERY OF GOODS

TECHNICAL FIELD

The present invention relates to the field of systems for receiving, loading, queueing, and delivery of orders, particularly for food product delivery, and more particularly, to a conveyor system for use in chain restaurants, bars, cafeterias, or the like, where orders can be loaded, queued, and delivered to a customer pick-up point.

BACKGROUND

Applicant has developed and markets an overhead conveyor system which is based on a continuous track made up into a closed loop that contains an endless "train" of small wheel cars connected together. The track is normally suspended from the ceiling or wall and can be made to snake through a building from a loading point to an unloading point and back again. Food products to be transported need to be in packages or bags, which are pushed into special product clips carried by some of the wheel cars. To release a bag from a clip, a lever arm is activated at the unloading point which releases the clip and the food is placed into a holding tray.

Another food transport system for the vertical transport of packaged food items from one floor of a restaurant to another floor is described in U.S. Pat. No. 7,708,135. The food transport system includes a conveyor that transports food-item supporting carriers along a closed-loop pathway defined by a belt or chain, to which the carriers are pivotably connected. Although the transport of food items placed on supporting carriers is convenient, the belt or chain-based conveyor system is much less flexible in terms of space utilization and winding transport pathways.

WO 2019/166480 of Applicant is also directed to a conveyor system for the transport of packaged food items in restaurants, etc., which allows a flexible design of layouts. This provides a track-based conveyor system with supporting carriers on which food items to be transported can be placed at a loading station. The food items are then transported to a customer delivery point which is remote from the loading station. The entire content of WO 2019/166480 is incorporated herein by reference as if fully set forth.

SUMMARY

The present disclosure is directed to a conveyor system for the transport of packaged food items in restaurants, bars, cafeterias, or the like, which allows a flexible design of layouts, is configured to move food products in any direction, horizontally or vertically, and which can provide fast, continuous transporting of food & drink orders, for example, from inside the restaurant to a second drive-thru lane adjacent to the first lane, at distance to the restaurant building.

In one aspect, a system for loading, queueing, and delivery of orders is provided. The system includes a controller, preferably having a processor and a fixed memory, as well as connections for data inputs and outputs, as explained in further detail below.

The system further includes a transport arrangement, including a pathway preferably defined by a track. The track can be curved at least in some sections, and preferably is a closed-loop pathway. In one embodiment, the track is a profiled track. A plurality of cars are guided on said track, with the cars being connected to a first drive, and the first drive being connected to the controller to selectively activate the first drive to advance the cars along the pathway. The first drive can be for example, a motor driven chain, cable, or belt that is connected to the cars. The cars are preferably a plurality of wheel cars movably contained within and guided by the profiled track. The wheel cars have an attachment side facing towards an open side of the profiled track, and the track is arranged such that its open side faces into a substantially horizontal direction and such that an attachment side of said cars is oriented substantially vertically in any position along the pathway. At least some of the cars have a carrier, with a carrier rack, and the carrier is pivotably mounted on the car, preferably on the attachment side. The carrier rack is adapted to support a product to be transported, with the carrier rack being maintained in a horizontal position as the carrier travels via the associated car along the pathway. The carrier rack includes a plurality of generally horizontally extending carrier rack fingers.

The system further includes a loading station including a loading platform at least at a first location along the pathway configured to receive one or more batches of product for each order. The loading platform includes at least one and preferably a series of parallel, generally horizontal loading platform fingers. In one embodiment, the loading platform is mounted for movement into and out of a path of the carrier racks via a loading platform drive that is connected to the controller, with the one or more loading platform fingers being adapted to pass between the carrier rack fingers when the loading platform is in the path of the carrier rack. Alternatively, the loading platform can be fixed in position.

The system further includes at least one of a load switch or load station sensor configured to signal the controller after a first said batch of product for a first said order has been loaded on the loading platform. The controller is configured to activate the loading platform drive to move the loading platform into the path of the carrier rack and to activate the first drive to advance the cars such that the first batch of product is lifted by the carrier rack attached to a first said car to advance the first batch of product for the first order to an unloading station located remote from the loading station.

The system further includes the unloading station, which has a plurality of one or more powered fingers at least at a second location along the pathway. The one or more powered fingers may be formed as a plurality of rollers arranged cantilevered from a finger support, and the plurality of rollers extend generally horizontally and are arranged to be located between the carrier rack fingers when the carrier rack passes through the second location. A second drive is provided that is connected to the one or more powered fingers, with the second drive being connected to the controller to selectively drive the one or more powered fingers. Alternatively, the one or more powered fingers may be formed as one or more belts or chains supported on rollers or sprockets, and arranged to be located between the carrier rack fingers when the carrier rack passes through the second location. In this case, the second drive would drive the rollers or sprockets to cause the belts or chains to provide a moving surface that the carrier rack can pass through. The one or more belts or chains would provide a moving surface that can translate the one or more batches of product in a direction perpendicular to the movement provided by an arrangement using the plurality of rollers.

The system further includes an offload and delivery sequencing arrangement that has at least a first parking conveyor, and in one preferred embodiment, includes first, second, and third sequential parking conveyors. These may be belt conveyors or driven rollers. The first sequential parking conveyor is arranged to receive the batches of product from the one or more powered fingers at the unloading station. The second sequential parking conveyor is arranged to receive the batches of product from the first sequential parking conveyor. The third sequential parking conveyor is arranged to receive the batches of product from the second sequential parking conveyor. First, second and third sequential parking conveyor drives are associated with respective ones of the first, second, and third sequential parking conveyors, and the first, second and third sequential parking conveyor drives are connected to the controller to selectively drive the first, second, and/or third sequential parking conveyors. Preferably sensors, such as camera(s), proximity, or break-beam sensors, are arranged to detect the products or batches of products on the first, second, and/or third sequential parking conveyors. The sensors are also connected to the controller.

The system further includes a present station configured to receive the batches of product from the last sequential parking conveyor and deliver the batches of product to a customer pick-up location.

In one arrangement, the present station includes a present mechanism arranged downstream from the last sequential parking conveyor and a present mechanism drive connected to the controller to selectively drive the present mechanism. This can be activated to deliver product from the last sequential parking conveyor to the customer pick-up location. Preferably, a sensor is provided to detect the products or batches of products on the present mechanism in order to determine if an order has been presented to the customer and picked-up. The present mechanism may be formed as a conveyor or a movable surface that is configured to move from a location adjacent to the last sequential parking conveyor to the customer pick-up location. This can be in any form. For example, a moving platform can be provided that transitions at least one of horizontally or vertically from the last parking conveyor to the customer pick-up location using vertical and/or horizontal drives or any other suitable arrangement.

In another aspect, the system includes an order receiving system. The order receiving system has at least one of an intercom, QR code reader, or touch screen that can be accessed by a customer to provide or directly input an order. An order controller, which can be separate from or combined with the controller noted above, is configured to receive the orders, and signals information to a display panel connected to the order controller in order to show the orders to users with a correct order sequence. The users may be employees of the restaurant or other business that uses the system, who prepare and assemble the order in one or more batches that are then placed on the loading platform at the loading station prior to activating the load switch or load station sensor that signals the controller to begin the process of delivering the order from the loading platform to the customer pick-up location.

In another aspect, a delivery bypass system is provided. The delivery bypass system includes one or more powered bypass fingers at least at a third location along the pathway. The one or more powered bypass fingers may comprise a second plurality of rollers arranged cantilevered from a movable bypass finger support, and the second plurality of rollers extend generally horizontally and are arranged to be located between the carrier rack fingers when the carrier rack passes the third location on the pathway. A bypass drive is connected to the powered bypass fingers, with the bypass drive being connected to the controller to selectively drive the powered bypass fingers. Alternatively, the one or more powered bypass fingers may be formed as one or more belts or chains supported on rollers or sprockets, and arranged to be located between the carrier rack fingers when the carrier rack passes through the third location, that are drivable by the bypass drive. A movable bypass finger support drive is also provided and is connected to the controller to selectively move the one or more powered bypass fingers in a generally horizontal direction from a first, inactive position, out of a path of the carriage rack, into a second, active position, in the path of the carriage rack.

The delivery bypass system further includes a bypass offload conveyor that is located adjacent to the powered bypass fingers in the second, active position. A bypass offload conveyor drive is connected to the controller to selectively drive the bypass offload conveyor. Additionally, a bypass delivery arrangement is provided that is configured to move one of the batches of product from the bypass offload conveyor downstream of all sequential parking conveyors to the present station.

In one embodiment, the bypass delivery arrangement includes a first plurality of powered transfer rollers arranged cantilevered from a transfer roller support. A first powered transfer roller drive is connected to the controller to selectively activate the first plurality of powered transfer rollers. The transfer roller support is supported for generally vertical movement between a first, receiving position adjacent to a delivery end of the bypass offload conveyor, and a second, bypass delivery position downstream of all sequential parking conveyors. A transfer roller support drive is connected to the controller to selectively move the transfer roller support from the first, receiving position to the second, bypass delivery position.

A second plurality of powered transfer rollers or belts are arranged at the second, bypass delivery position, the second plurality of powered transfer rollers or belts being arranged to be in positions between the first plurality of powered transfer rollers when the transfer roller support is in the second, bypass delivery position. A second powered transfer roller drive is connected to the controller to selectively activate the second plurality of powered transfer rollers or belts.

The system preferably includes respective first, second, third, etc. product sensors associated with each of the first, second, third, etc. sequential parking conveyors. Additional sensors can also be provided at various points along the pathway so that orders or batches of products that make up the orders can be tracked throughout their journey through the system.

In another aspect, a method for loading, queueing, and delivery of orders using the system described herein is provided. The method includes:

- loading the first order or a first said batch of product for the first order on the loading platform at the loading station;
- signaling the controller with the load switch or load station sensor;
- the controller activating the first drive to advance the cars along the track such that a first one of the carrier racks passes with the carrier rack fingers between or around the one or more loading platform fingers to pick-up the first order or the first said batch of product for the first order;
- the controller continuing to activate the first drive at least until the first one of the carrier racks is transported to the unloading station, and the carrier rack fingers pass between or around the one or more powered fingers at the unloading station; and

- the controller activating the second drive such that the first order or the first said batch of product for the first order is transported by the one or more powered fingers to the first sequential parking conveyor at the offload and delivery sequencing arrangement.

In a preferred embodiment, the loading platform is movable, and the method further includes the controller activating the loading platform drive, moving the loading platform into the path of the carrier racks, and, after the first one of the carrier racks passes with the carrier rack fingers between or around the one or more loading platform fingers to pick-up the first order or the first said batch of product for the first order, the controller activating the loading platform drive to move the loading platform out of the path of the carrier racks.

In one aspect, the first order or the first said batch of product for the first order is the first order, and the method further includes:

- the controller activating at least one parking conveyor drive, and in one exemplary embodiment, the first, the second, and the third sequential parking conveyor drives to deliver the first order to the present mechanism.

In another aspect, the first order or the first said batch of product for the first order is the first said batch of product for the first order, and the method further includes:

- the controller activating the at least one, and in one exemplary embodiment, the first, the second and the third sequential parking conveyor drives to deliver the first said batch of product for the first order to the third sequential parking conveyor;
- loading a second said batch of product for the first order on the loading platform at the loading station;
- signaling the controller with the load switch or load station sensor;
- the controller activating the loading platform drive, if present, moving the loading platform into the path of the carrier racks, and activating the first drive to advance the cars along the track such that a second one of the carrier racks passes with the carrier rack fingers between or around the one or more loading platform fingers to pick-up the second said batch of product for the first order;
- the controller activating the loading platform drive, if present, to move the loading platform out of the path of the carrier racks;
- the controller continuing to activate the first drive at least until the second one of the carrier racks is transported to the unloading station, and the carrier rack fingers pass between or around the one or more powered fingers at the unloading station;
- the controller activating the second drive such that the second said batch of product for the first order is transported by the one or more powered fingers to the first sequential parking conveyor at the offload and delivery sequencing arrangement; and
- the controller activating the first and the second sequential parking conveyor drives to deliver the second said batch of product for the first order to the second sequential parking conveyor.

Then, if the first order is complete with the first and second said batches of product, the method includes the controller activating the second and the third sequential parking conveyor drives to deliver the first order to the present mechanism.

Those skilled in the art will understand that the use of three of sequential parking conveyors is merely exemplary, and the number can be changed depending on the particular application, and the method adjusted according to the number of sequential parking conveyors provided.

In another aspect, the order receiving system is provided including at least one of an intercom, QR code reader, or touch screen. The method further includes the system receiving an order via the order receiving system and signaling an order controller configured to receive the orders; and

- displaying the orders on a display panel connected to the order with the orders displayed in a correct order sequence.

In this case, the method can further include a user loading the first order or the first said batch of product for the first order on the loading platform at the loading station based on the order displayed on the display panel; and

- a user signaling the controller that the first order or the first said batch of product for the first order on the loading platform is complete.

The method steps can be repeated for a second (or subsequent) order or a first said batch of product for the second (or subsequent) order.

In another aspect, the delivery bypass system is provided, and the method further includes using the bypass delivery system to deliver a second or subsequent batch of the first order to the present mechanism ahead of the second order or the first said batch of product for the second order.

In another aspect, the delivery bypass system is provided separately, for example for retrofit applications. Here, the delivery bypass system is for use with an order system for loading, queueing, and delivery of orders, such as disclosed herein, and includes one or more powered bypass fingers configured to be located at a location along a pathway of the order system. The one or more powered bypass fingers extend generally horizontally and are configured to be located between carrier rack fingers of a carrier rack of the order system that pass the location on the pathway. A bypass drive is connected to the one or more powered bypass fingers, and the bypass drive is configured for connection to a controller of the order system to selectively drive the one or more powered bypass fingers, A movable bypass finger support drive configured to be connected to the controller to selectively move the one or more powered bypass fingers in a generally horizontal direction from a first, inactive position, adapted to be out of a path of the carriage rack, into a second, active position, adapted to be in the path of the carriage rack; A bypass offload conveyor located adjacent to the one or more powered bypass fingers in the second, active position, and a bypass offload conveyor drive connected to the controller to selectively drive the bypass offload conveyor. A bypass delivery arrangement is provided that is configured to move one of the batches of product from the bypass offload conveyor downstream of at least one sequential parking conveyor and/or to a present station of the delivery system.

It is noted that the features described herein can be used alone or in various combinations with some or all of the other features.

BRIEF DESCRIPTION OF THE DRAWINGS

Further advantages and characteristics of the invention will become apparent by the below description of embodiments making reference to the accompanying drawings, in which:

FIGS. 10, 10.1, 10.2 and 11 are views similar to FIG. 9 showing a fourth step with the order received on a bypass delivery arrangement, in this case in the form of a vertical delivery system that receives the order from the offload conveyor (FIG. 10) and then being moved down (FIG. 10.1), and a fifth step in which the order is moved to a delivery position (FIG. 10.2) or a further extended delivery position (FIG. 11) in front of an order already queued in the offload and delivery sequencing arrangement.

DETAILED DESCRIPTION

Figure 1:
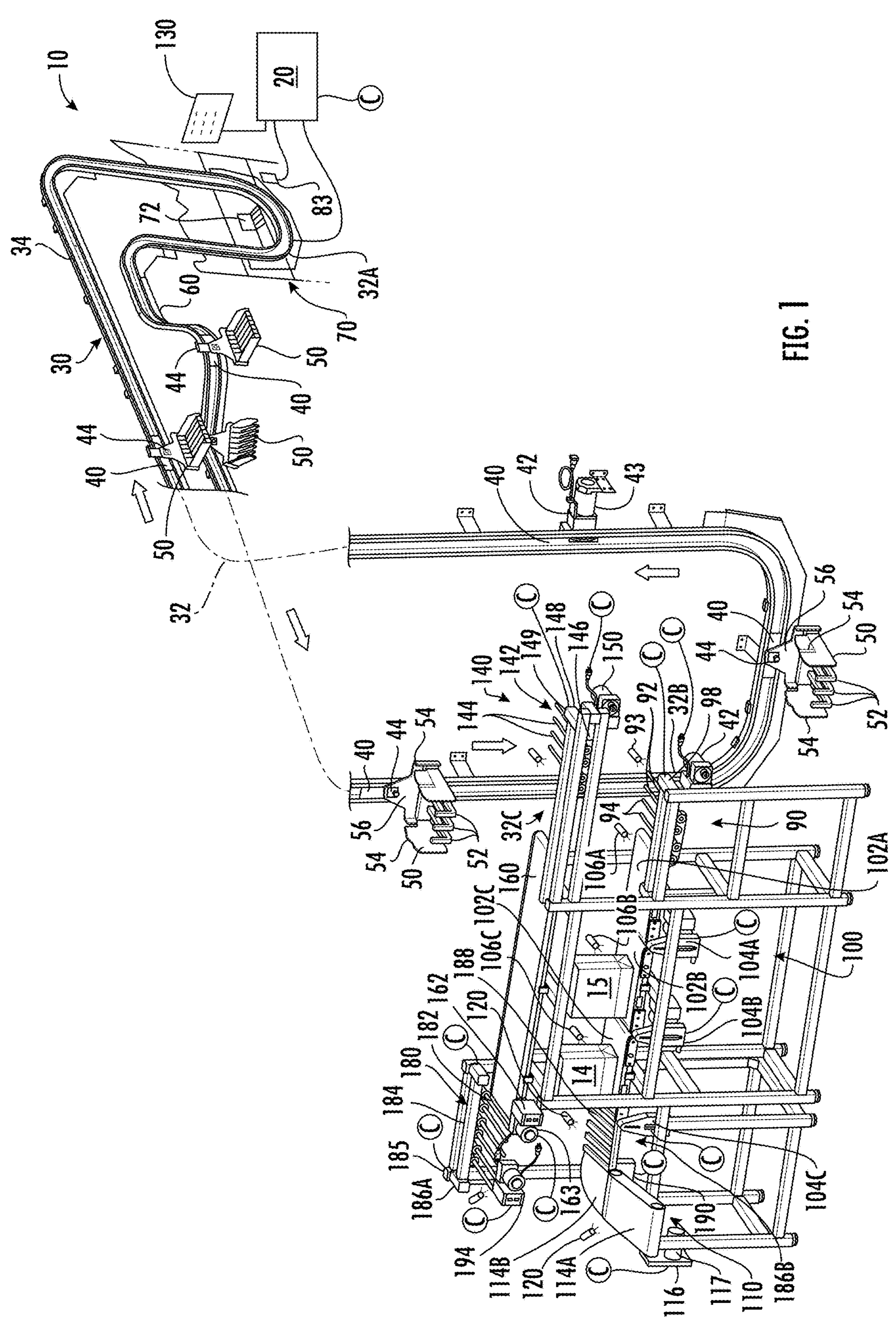
FIG. 1 is a schematic perspective view for a system for loading, queuing, and delivery of orders in accordance with the disclosure.

Certain terminology is used in the following description for convenience only and is not limiting. The words "right," "left," "top," and "bottom" designate directions in the drawings to which reference is made. The words "a" and "one," as used in the claims and in the corresponding portions of the specification, are defined as including one or more of the referenced item unless specifically stated otherwise. This terminology includes the words above specifically mentioned, derivatives thereof, and words of similar import. The phrase "at least one" followed by a list of two or more items, such as "A, B, or C," means any individual one of A, B or C as well as any combination thereof. The terms approximately or generally mean within +/−10% of a specified value unless otherwise noted and within +/−5° of a specified angle or direction. "Track" can mean a strip or rail configured for guiding a slider or wheeled car, or a conveyor formed by one or more belts or cables that travel around guides, rolls, or pulleys, that include or carry connector bodies for the carrier basket and define a fixed travel path. A "powered finger" can include any driven element to cause translatory surface movement, such as a driven roller, belt, or chain, and the width or effective area can vary depending on the particular application. For example, a single powered finger could comprise a single conveyor belt or linked chain belt having a desired width for carrying product around which carrier rack fingers pass. Alternatively, a plurality of powered fingers having narrower widths can be used, and the carrier rack fingers would pass between the plurality of powered fingers.

Referring to FIGS. 1-4, a system 10 for loading, queuing, and delivery of orders in accordance with the present disclosure is shown. The orders are schematically shown as bags 14, 15 on the conveyor in FIG. 1, and include products 12 in the bags. In the further figures, if an order 14 is separated into multiple batches, these are indicated as 14.1, 14.2, etc.

The system 10 includes a controller 20, which is preferably a processor based controller having a memory that can be programmed in order to operate the system 10 as discussed in detail below. For the sake of simplicity in the drawings, connection between the various system components and the controller 20 are indicated with a ©. These may be wired or wireless connections.

The system 10 includes a transport arrangement 30 which has a pathway 32 defined by a track 34. FIG. 1 schematically shows an exemplary set-up of the track 34 which uses a profile track made of, for example, light-weight aluminum track sections that are connected together to form a closed loop. While a closed loop is preferred, this is not a requirement of the system. The track 34 can be arranged to snake through a building from a loading station 70 to an unloading station 90 and back again. The track 34 can run horizontally in a straight line, around corners, in a straight line in a vertical direction, and possibly in a straight line at an incline.

While the track arrangement shown in FIG. 1 is one example, the actual design and path of the track 34 would be determined by the location, orientation of the loading and unloading points, as well as the lay out of the building itself. Typically, the track 34 would run from the loading station 70 located near a food preparation area and the unloading station 90 that is located at a customer pick-up point, such as a drive-through window. Accordingly, any specific layout shown in the exemplary embodiment of FIG. 1 is considered non-limiting.

A plurality of cars 40 are guided on the track 34. The cars 40 may be wheeled, or may be formed as a connector body that can slide or otherwise move along the path defined by the track 34 The cars 40 are connected to a first drive 42, which can be for example a belt, chain, toothed drive, or any other drive system to move the cars 40 continuously along the track 34.

In one embodiment, the cars 40 are connected together by hinged joints to form a continuous train of cars 40, and the cars 40 are moved around the track system by the first drive 42 that is connected to the controller 20 to selectively activate the first drive 42 to advance the cars 40 along the pathway 32. The first drive 42 preferably includes an electric motor for example indicated at 43 that may engage through an opening in the track with a drive gear that interacts with teeth incorporated into the cars 40. This can be, for example, as shown in U.S. patent application Ser. No. 16/971,083, filed Aug. 19, 2020, which is incorporated herein by reference as if fully set forth. Alternatively, the motor 43 may drive a belt, cable, or chain connected between the cars 40.

A carrier 44 is preferably connected to at least some of the cars. The carrier 44 can be a projecting pin or other type of connector that is attached to a car 40 A carrier rack 50 is pivotally mounted to the carrier 44 such that the carrier rack 50 is maintained in a generally horizontal position as the carrier 44 travels along the pathway 32. This can be, for example, as shown in U.S. patent application Ser. No. 16/971,083, filed Aug. 19, 2020. The carrier rack 50 is adapted to receive a product 12 for an order 14, 15 or batches 14.1, 14.2 of product 12 that make up a single order 14 at the loading station 70 in order to deliver the product 12 to the unloading station 90. As shown in FIG. 1, the carrier rack 50 includes a plurality of generally horizontally extending carrier rack fingers 52, as well as sides 54 and a back 56. The carrier rack 50 can be made of any suitable material, but is preferably a molded polymeric material. The connection between the carrier rack 50 and the carrier 44 may be in the form of a ball joint or other pivotal connection.

Figure 3:
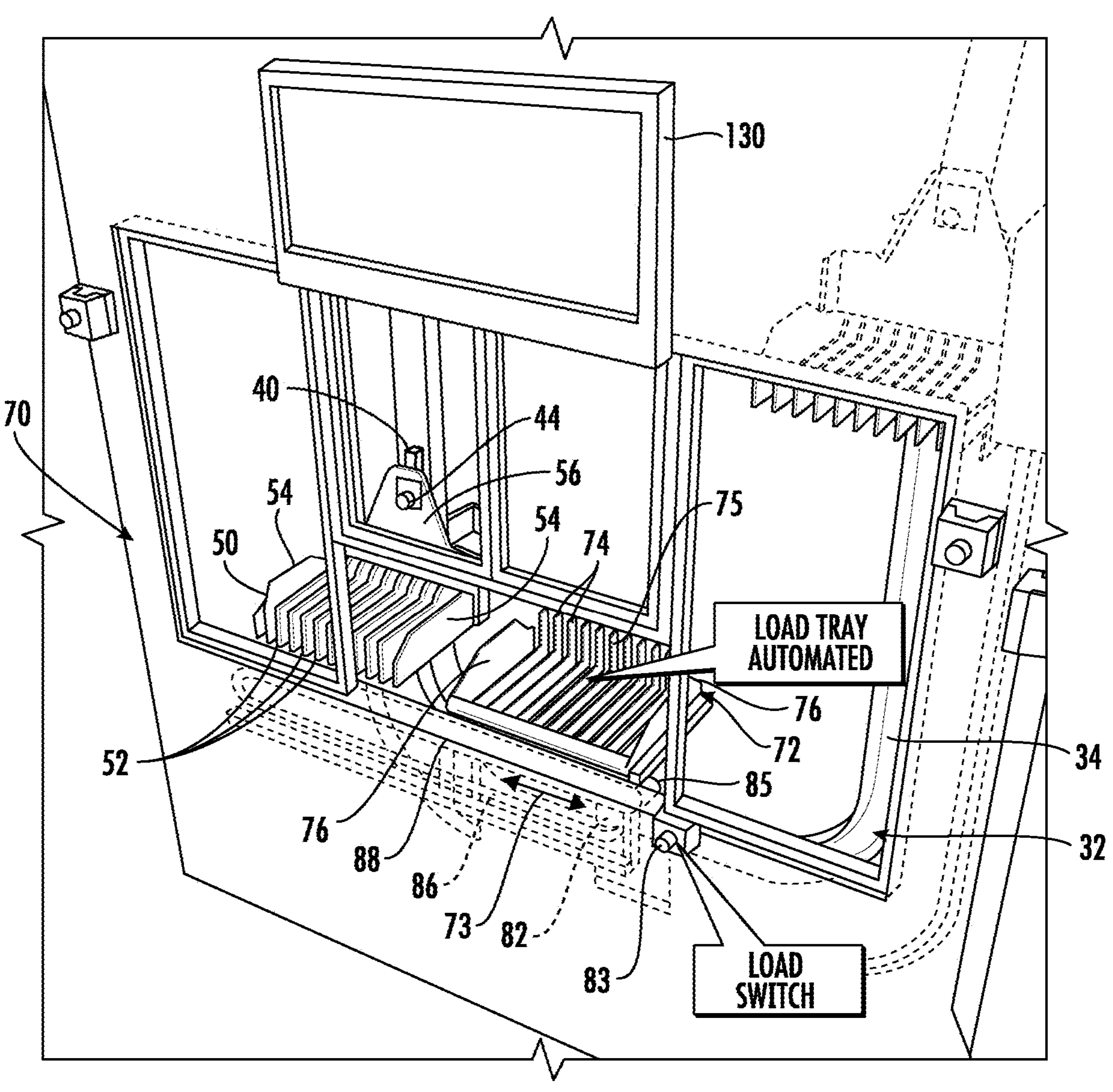
FIG. 3 is a perspective view of the loading station for the system shown in FIG. 1.

Referring to FIGS. 1 and 3, the loading station includes a loading platform 72 at least at a first location 32A along the pathway 32 that is configured to receive one or more batches of product 12 for each order. The loading platform 72 comprises at least one, and in this embodiment a series of parallel, generally horizontal loading platform fingers 74, best seen in FIG. 3. These loading platform fingers 74 may have an upstanding portion 75 which prevents product from sliding off the back of the loading platform 72 and may also have sides 76. In the illustrated embodiment, the loading platform 72 is mounted for movement (indicated by arrow 73) into and out of a path of the carrier racks 50 via a loading platform drive 82 that is connected to the controller 20. Alternatively, the loading platform 72 can be mounted in a fixed position at the first location 32A along the pathway 32. The carrier rack fingers 52 are adapted to pass between the loading platform fingers 74 when the loading platform 72 is in the path of the carrier rack 50.

As shown in FIG. 3, the loading platform drive 82 preferably includes a motor 85 connected to a drive belt or chain 86 that can be activated in the forward and reverse directions in order to move the loading platform 72 comprised of the one or more loading platform fingers 74 into and out of the path of the carrier rack 50. As shown in FIG. 3, the carrier platform fingers 74 are preferably mounted in a cantilever manner from a loading platform support 88 that is connected to the drive belt or chain 86. The loading platform support 88 can be mounted on a support channel or rail and may be supported by linear bearings (not shown).

Still with reference to FIGS. 1 and 3, at least one load switch or load station sensor 83 is provided and is configured to signal the controller 20 after a batch 14.1 of product 12 for an order 14 or all of the products 12 for the entire order 14 have been loaded on the loading platform 72. If the loading platform 72 is movable, the controller 20 is configured to activate the loading platform drive 82 to move the loading platform 72 into the path of the carrier rack 50 and to activate the first drive 42 to advance the cars 40 so that the order 14 or the first batch 14.1 of product 12 for the order 14 is lifted by the carrier rack 50 attached to a first car 40 to advance the product 12 for the first order 14 to an unloading station 90 located remote from the loading station 70. The first drive 42 may be activated to run continuously or on demand, depending upon the overall system requirements.

Figure 4:
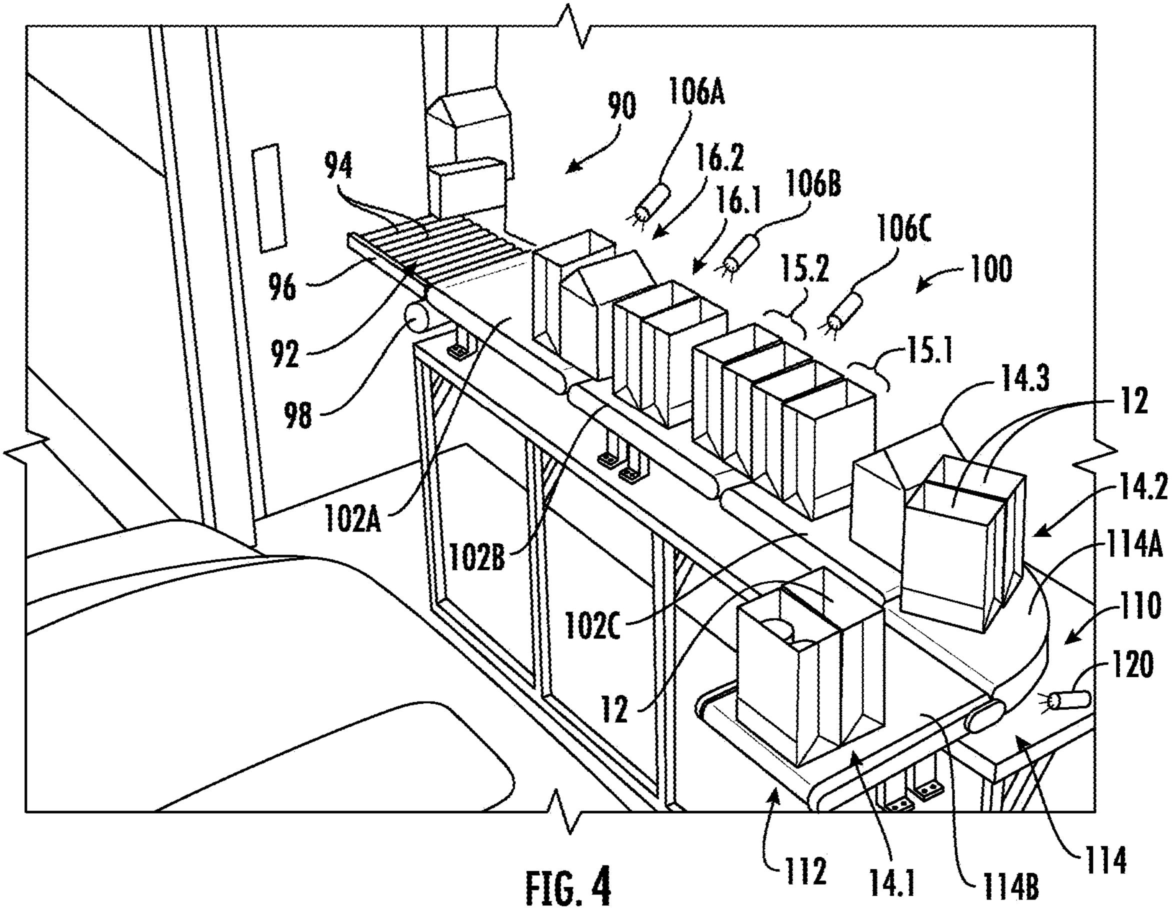
FIG. 4 is a perspective view of an unloading station for the system shown in FIG. 1.

Referring now to FIGS. 1 and 4, the unloading station 90 is shown and includes at least one finger, and in this embodiment a plurality of powered fingers 92 at least at a second location 32B along the pathway 32. The powered fingers 92 may comprise a plurality of rollers 94 arranged cantilevered from a roller support 96, and the plurality of rollers 94 extend generally horizontally and are arranged to be located between the carrier rack fingers 52 when the carrier rack 50 passes through the second location 32B. In a further embodiment shown in FIG. 12, a single finger 92' is provided, and passes between the carrier rack fingers 52'. A second drive 98 is connected to the plurality of rollers 94. The second drive 98 is also connected to the controller 20 to selectively drive the one or more powered fingers 92. The second drive 98 preferably includes an electric motor 99 that drives a belt or chain that is connected to sprockets on the ends of the rollers 94 at the roller support 96, or drives a drive train formed of a plurality of gears. The one or more powered fingers 92 may be formed as one or more belts or chains supported on rollers or sprockets, and arranged to be located between the carrier rack fingers 52 when the carrier rack 50 passes through the second location 32B. In this case, the second drive 98 would drive the rollers or sprockets to cause the belts or chains to provide a moving surface that the carrier rack 50 can pass through.

Still with reference to FIGS. 1 and 4, an offload and delivery sequencing arrangement 100 is provided adjacent to the unloading station 90. The offload and delivery sequencing arrangement 100 includes at least a first sequential parking conveyor, and in the exemplary embodiment shown, includes first, second, and third sequential parking conveyors 102A, 102B, 102C. Those skilled in the art will recognize that the number of sequential parking conveyors 102A, 102B, 102C, etc. used in a particular application may vary, and that the description of the exemplary embodiment with three sequential parking conveyors is for illustrative purposes only and is not limiting. In this embodiment, the first sequential parking conveyor 102A is arranged to receive the batches of product 12 from powered fingers 92, the second sequential parking conveyor 102B is arranged to receive the batches of product 12 from the first sequential parking conveyor 102A, and the third sequential parking conveyor 102C is arranged to receive the batches from the second sequential parking conveyor 102B. First, second, and third sequential parking conveyor drives 104A, 104B, 104C are associated with respective ones of the first, second, and third parking conveyors 102A, 102B, 102C. These first, second, and third sequential parking conveyor drives 104A-104C are connected to the controller 20 to selectively drive the first, second, and third parking conveyors 102A-102C. The first, second, and third parking conveyors 102A-102C may be roller conveyors or belt conveyors and the associated drives 104A-104C are preferably electric motors which are drivingly engaged with rollers of a roller conveyor or at least one of the rollers on which the conveyor belts travel for belt conveyors. Both roller and belt conveyors are well known in the art and accordingly a further detailed description is not provided here. However, as would be understood by a person of ordinary skill in the art, activating the conveyor drive 104A-104C of one or more of the first, second, and third sequential parking conveyors 102A-102C would cause such parking conveyor to advance any product 12 located on the surface.

As shown in FIGS. 1 and 4, a present station 110 is configured to receive the product 12 from the last sequential parking conveyor, which in the exemplary embodiment is the third sequential parking conveyor 102C and deliver the product 12 to a customer pickup location 112. The product 12 may be sent as a complete order 14, or may be sent in separate batches 14.1, 14.2, etc. to form a complete order 14, depending on the number of products 12 that were in the order 14. This is described in further detail below.

As shown in FIG. 4, the present station 110 may include a present mechanism 114 arranged downstream from the last, or in the exemplary embodiment, third sequential conveyor 102C and a present drive 116 is connected to the controller 20 for the conveyor 114. The present mechanism 114 may be in the form of a conveyor that includes one or more segments 114A, 114B. In the arrangement shown in FIG. 4, the present conveyor 114A turns 90° while the present conveyor 114B is a straight segment. Alternatively, this can be a single conveyor depending upon the particular installation. The present conveyor(s) 114A, 114B are preferably belt conveyors that are supported on rollers, not described in further detail here, and the present conveyor drive 116 preferably includes an electric motor 117 that is drivingly engaged with at least one of the rollers that supports that conveyor belt(s).

Alternatively, the present mechanism 114 may include a movable surface, such as a platform, rollers, conveyor, or other arrangement that translates the product 12 to the pickup location 112. Additionally, as shown schematically in FIG. 4, at least one product sensor 120 that is configured to sense products 12 on the present mechanism 114 is provided. The product sensor 120 can be a break-beam sensor, a camera or any other type of proximity sensor and is connected to the controller 20. The product sensor 120 thereby notifies the controller 20 when the product 12 is removed from the customer pick-up location 112.

Figure 2:
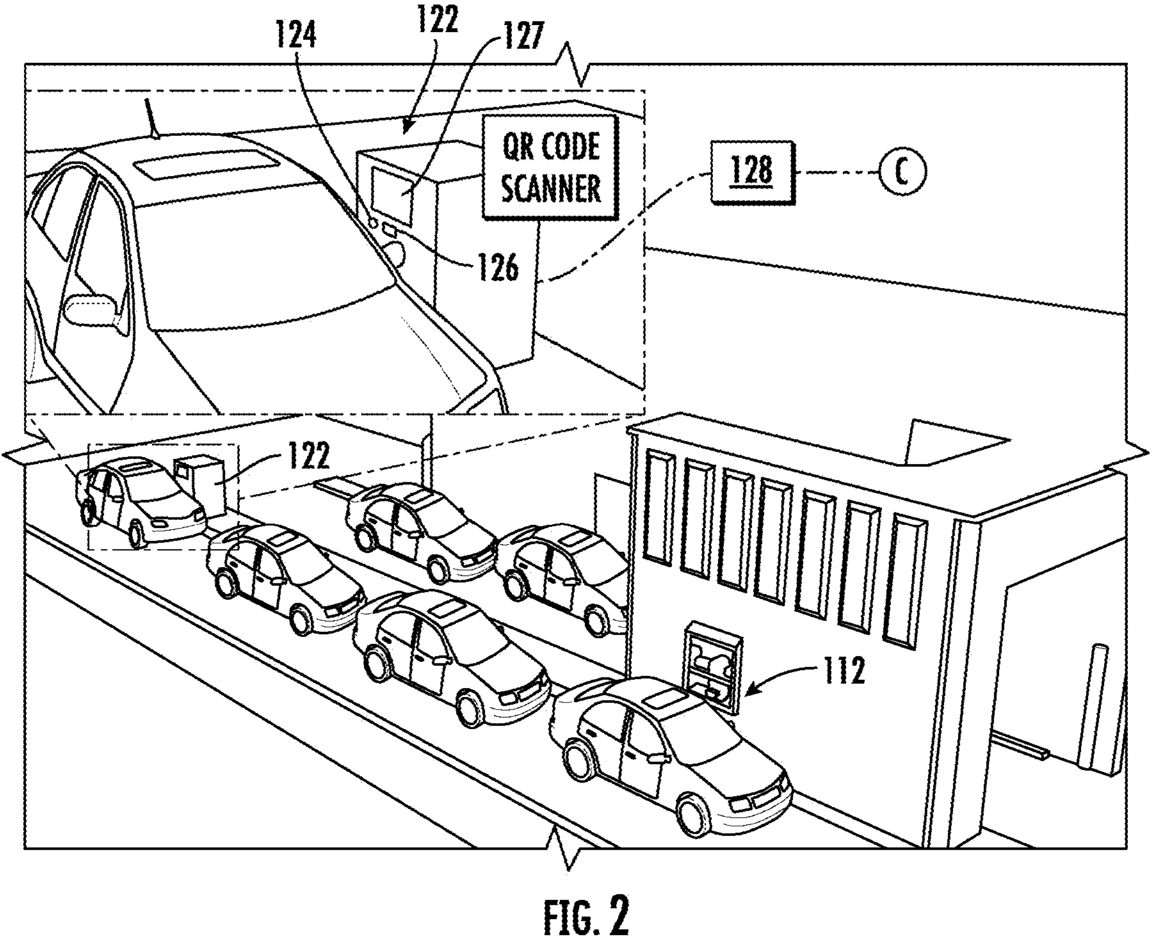
FIG. 2 is a perspective view showing an order receiving system for use with the system shown in FIG. 1, preferably at a second drive-thru lane at a restaurant.

Referring to FIG. 2, preferably the system 10 further includes an order receiving system 122 that has at least one of an intercom 124, a QR code reader 126, or a touch screen 127. An order controller 128 is provided that is configured to receive orders, either directly via the QR code reader 126 or the touchscreen 127, or via a user who receives the order from the intercom 124 and inputs into the order controller 128 using, for example, a keyboard or other input device. A display panel 130, shown in FIGS. 1 and 3, is connected to the order controller 128 and is configured to show the orders to users with a correct order sequence. This is then used by the users in order to place the various orders 14, 15, 16, or batches 14.1, 14.2, etc. for the orders 14, 15, 16 of product 12 in position at the loading station 70. The order controller 128 can be a separate controller that interfaces with the controller 20 for the system 10 or may be a program within the controller 20.

As shown in FIG. 1, in the exemplary embodiment preferably first, second, and third product sensors 106A, 106B, 106C are associated with each of the first, second, and third sequential parking conveyors 102A, 102B, 102C. These product sensors 106A-106C are connected to the controller 20 and signal the controller whether or not product 12 is located on each of the first, second, and third sequential parking conveyors 102A, 102B, 102C. The number of sensors 106A, 106B, 106C will vary depending on the number of sequential parking conveyors 102A, 102B, 102C These product sensors 106A-106C may be break beam sensors, cameras, proximity sensors, or any type of sensor to detect the presence or absence of product 12 on the respective sequential parking conveyors 102A-102C.

Referring to FIGS. 1 and 6-11, the system 10 may also include a delivery bypass system 140 that is used to advance an order (14.2 in FIGS. 7-11) or part of an order out of turn ahead of orders (15.1, 15.2 in FIGS. 6-11) which were previously staged on the first, second, and third sequential parking conveyors 102A-102C.

The delivery bypass system 140 includes one or more powered bypass fingers 142 at least at a third location 32C along the pathway 32. The one or more powered bypass fingers 142 may comprise a second plurality of rollers 144 arranged cantilevered from the movable bypass finger support 146, as shown. The second plurality of rollers 144 extend generally horizontally and are arranged to be located between the carrier rack fingers 52 when the carrier rack 50 passes the third location 32C on the pathway 32. A bypass drive 148 is connected to the second plurality of rollers 144. The bypass drive 148 is also connected to the controller 20 to selectively drive the power bypass rollers 142. The bypass drive 148 is preferably an electric motor 149 that is drivingly connected to the second plurality of rollers 144 by a belt or chain at the ends supported at the movable bypass finger support 146. Alternatively, the one or more powered bypass fingers 142 may be formed one or more belts or chains supported on rollers or sprockets, and arranged to be located between the carrier rack fingers 52 when the carrier rack 50 passes through the third location 32C, that are drivable by the bypass drive 148.

Additionally, a movable bypass finger support drive 150 is arranged to move the movable bypass finger support 146 from a first, inactive position 152A, out of a path of the carriage rack 50, into a second, active position, 152B, in the path of the carriage rack 50. The movable bypass finger support drive 150 is connected to the controller 20 in order to be selectively activated to move the second plurality of rollers 144 as noted when the delivery bypass system 140 is activated. This arrangement would apply similarly for the alternate powered bypass fingers 142

Still with reference to FIGS. 1 and 6-11, a bypass offload conveyor 160 is located adjacent to the one or more powered bypass fingers 142 in the second, active position 152B. A bypass offload conveyor drive 162 is connected to the controller 20 to selectively drive the bypass offload conveyor 160. The bypass offload conveyor drive 162 preferably includes an electric motor 163 that is drivingly connected to a roller which supports that conveyor belt of the bypass offload conveyor 160. Alternatively, the bypass offload conveyor 160 could be a roller conveyor.

A bypass delivery arrangement 180 is configured to move one of the batches 14.2 of product 12 from the bypass offload conveyor 160 downstream of the sequential parking conveyors, shown in the exemplary embodiment as the first, second, and third sequential parking conveyors 102A, 102B, 102C to the present station 110 ahead of batches 15.1, 15.2 already on the second and third sequential parking conveyors 102B, 102C. The bypass delivery arrangement 180 can include a first plurality of powered transfer rollers 182 arranged cantilevered from a transfer roller support 184. The transfer roller support 184 is supported for generally vertical movement between a first, receiving position 186A, adjacent to a delivery and of the bypass offload conveyor 160, and a second, bypass delivery position 186B, downstream of the first, second, and third sequential parking conveyors 102A-102C. A powered transfer roller drive 185 is provided and is connected to the power transfer rollers 182 preferably via a belt or chain drive at the ends supported at the transfer roller support 184. The power transfer roller drive 185 is connected to the controller 20 and can be selectively activated to rotate the power transfer rollers 182 to receive product from the bypass offload conveyor 160 as well as to offload the product 12.

Further, the bypass delivery arrangement 180 includes a second plurality of power transfer rollers or belts 188 arranged at the second, bypass delivery position 186B. The second plurality of power transfer rollers or belts 188 is arranged to be in positions between the first plurality of powered transferred rollers 182 when the transfer roller support 184 is in the second, bypass delivery position 186B. A second, powered transfer roller drive 190 is connected to the controller to selectively activate the second plurality of powered transfer rollers or belts 188. Preferably, the second powered transfer roller drive 190 is an electric motor and is connected to the second plurality of power transfer rollers or belts 188 via a shaft, belt or chain drive. As shown in FIG. 1, the second plurality of power transfer rollers or belts 188 is also mounted in a cantilevered manner in order to allow the first plurality of power transfer rollers 182 arranged therebetween in the second, bypass delivery position 186B. They also bridge the space between the third (or last)

sequential parking conveyor 102C and the present station 110 when the bypass delivery arrangement 180 is provided.

In order to move the first plurality of power transfer rollers 182 into the second, bypass delivery position 186B, the transfer roller support 184 is supported on both sides by vertical guides which are adapted to move up and down vertically. A vertical drive 194 is connected to the vertical guides in order to move the transfer roller support 184 between the first, receiving position 186A and the second, bypass delivery position 186B. Linear bearings can be used in connection with the guides as will be understood by those of ordinary skill in the art.

Figure 6:
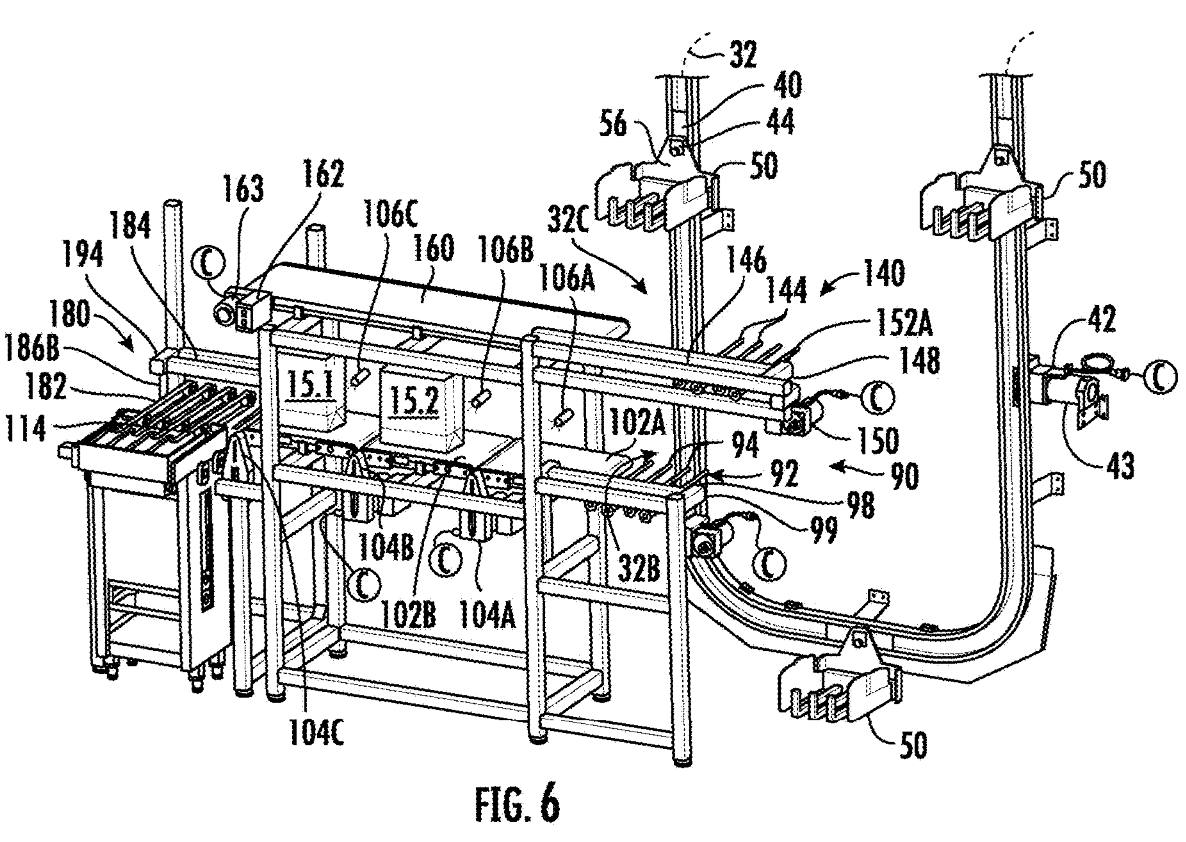
FIG. 6 is a schematic perspective view of a delivery bypass system that can be used in connection with the system of FIG. 1.
Figure 7:
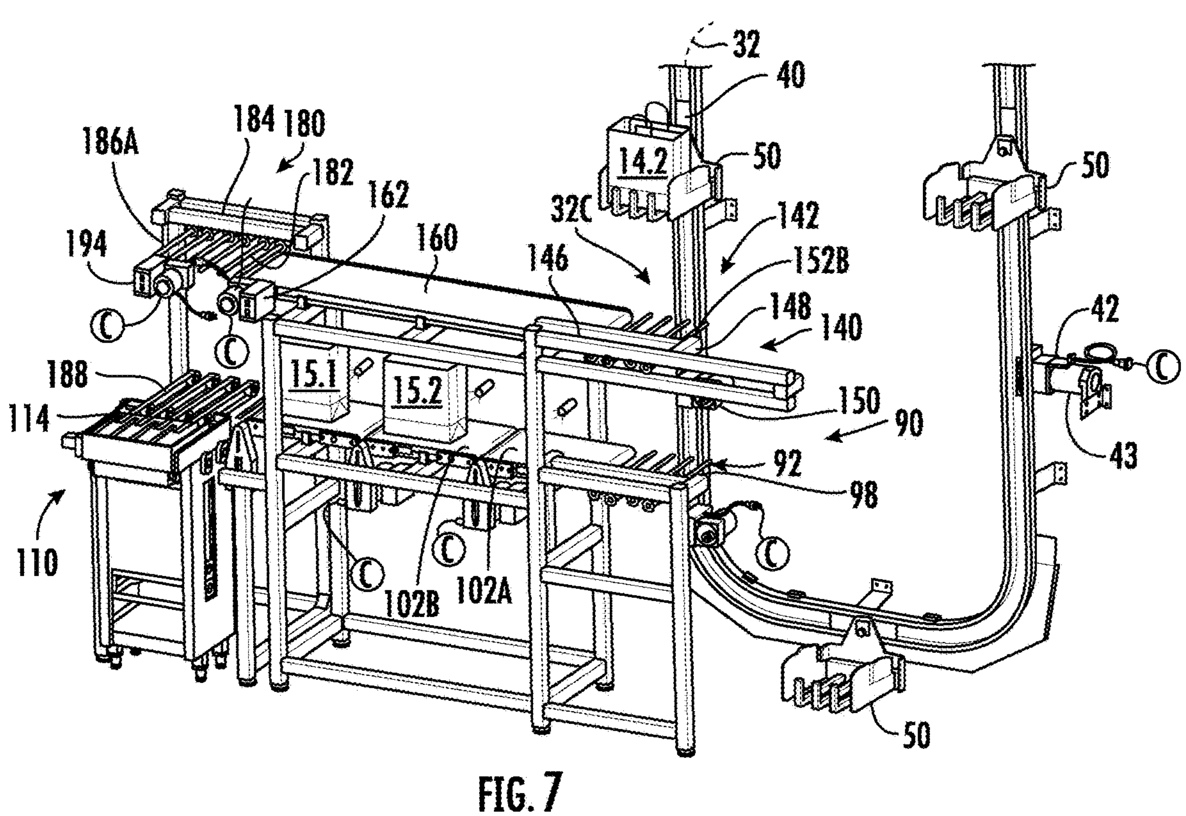
FIG. 7 is a perspective view similar to FIG. 6 showing the first step in an order being delivered through the delivery bypass system.

Referring to FIGS. 6-11, in sequence, these Figures show the delivery bypass system 140 being activated by the controller 20 to move a batch 14.2 of product 12 for a first order ahead of batches 15.1, 15.2 for a second order 15 already on the second and third sequential parking conveyors 102B, 102C (shown in FIG. 6). In FIG. 7, the batch 14.2 of product 12 that needs to be advanced out of sequence is shown being delivered to the third location 32C along the pathway 32 by a carrier rack 50. The one or more powered bypass fingers 142 have been moved the movable finger roller support 146 from the first, inactive position 152A, out of a path of the carriage rack 50, into the second, active position, 152B, in the path of the carriage rack 50.

Figure 8:
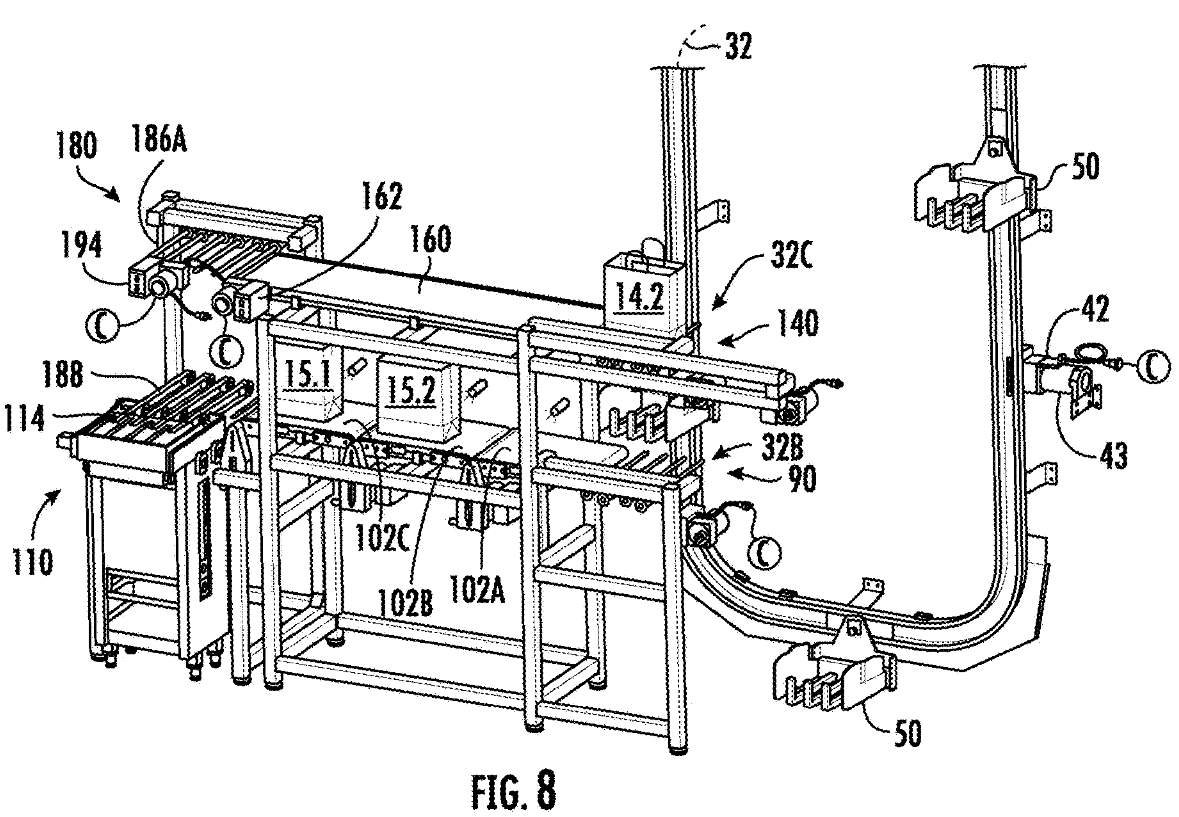
FIG. 8 is a schematic perspective view showing similar to FIG. 7 showing a second step with a bypass order being received on a plurality of powered bypass fingers of the delivery bypass system.
Figure 9:
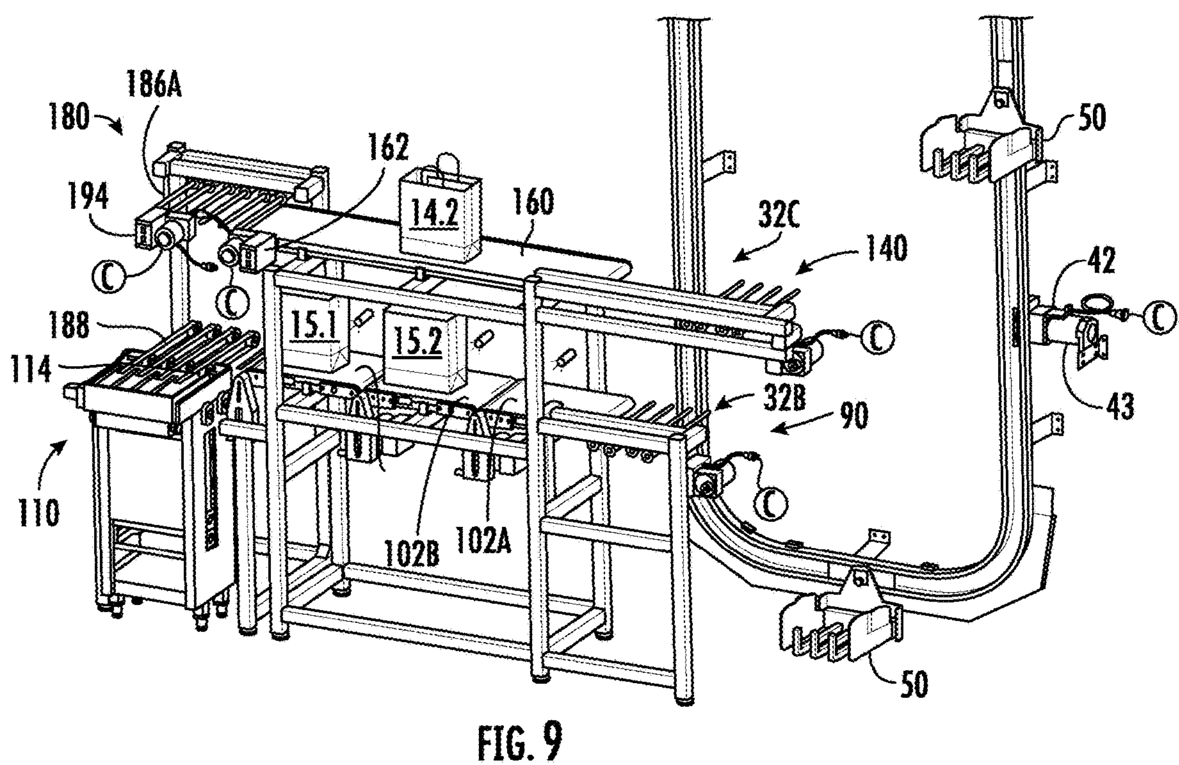
FIG. 9 is a perspective view similar to FIG. 8 showing a third step with the order traveling on a bypass offload conveyor.

In FIG. 8, the batch 14.2 of product 12 is received on the one or more powered bypass fingers 142 as the carrier rack 50 drops through the third location 32C. The controller 20 activates the bypass drive 148 to move the batch 14.2 of product 12 onto the bypass offload conveyor 160, which also advances the batch 14.2 of product 12 by the controller 20 activating the bypass offload conveyor drive 162, as shown in FIG. 9. The controller 20 also activates the vertical drive 194 for the transfer roller support 184 to move the power transfer rollers 182 to the receiving position 186A.

In FIG. 10, the controller 20 has activated the first plurality of powered transfer rollers 182 at the bypass delivery arrangement 180 to receive the batch 14.2 of product 12 thereon in the first, receiving position 186A. In FIG. 10.1, the controller 20 also activates the vertical drive 194 for the transfer roller support 184 to move the power transfer rollers 182 with the batch 14.2 of product 12 to second, bypass delivery position 186B, downstream of the batches 15.1 and 15.2 on the second and third sequential delivery conveyors 102B, 102C. The controller 20 activates the second, powered transfer roller drive 190 for the second plurality of power transfer rollers or belts 188 arranged between the first plurality of powered transferred rollers 182 to move the batch 14.2 of product 12 either directly to a customer pick-up location 112 which can be the position shown in FIG. 10.2, or moves the batch 14.2 of the product 12 to the present mechanism 114 that move the batch 14.2 of the product 12 to the customer pick-up location 112 as shown in FIG. 11.

The delivery bypass system 140 can also be provided as a separate system that is adapted or configured for use with an existing order, queueing, and delivery system.

A method for loading queuing, and delivery of orders using the system 10, and in particular the exemplary embodiment with first, second, and third sequential parking conveyors 102A, 102B, 102C as described above, is also provided. The method includes:

Loading the first order 14 or a first said batch 14.1 of product 12 for the first order 14 on the loading platform 72 at the loading platform station 70;

Signaling the controller 20 with the load switch or the load station sensor 84;

The controller 20 activating the loading platform drive 82, moving the loading platform 72 into the path of the carrier racks 50, and activating the first drive 42 to advance the cars 40 along the track 34 such that a first one of the carrier racks 50 passes with the carrier rack fingers 52 between or around the one or more loading platform fingers 74 to pick-up the first order 14 or the first said batch 14.1 of product 12 for the first order 14;

The controller 20 activating the load platform drive 82 to move the loading platform 72 out of the path of the carrier racks 35;

The controller 20 continuing to activate the first drive 42 at least until the first one of the carrier racks 50 travels to the unloading station 90 at the second location 32B, and the carrier rack fingers 52 pass between or around the one or more powered fingers 92 at the unloading station 90; and The controller 20 activating the second drive 98 such that the first order 14 or the first said batch 14.1 of product 12 for the first order 14 is transported by the one or more powered fingers 92 to the first sequential parking conveyor 102A at the offload and delivery sequencing arrangement 100.

The method may further include that the first order 14 or the first said batch 14.1 of product 12 for the first order 14 is in fact the first complete order 14. In this case, the controller 20 activates the first, second, and the third sequential parking conveyor drives 104A-104C to deliver the first order 14 via the first, second, and third sequential parking conveyors to the present station 110.

Alternatively, if the batch 14.1 of product 12 for the first order 14 is being delivered, the method then includes the controller 20 activating the first, the second, and the third sequential parking conveyor drives 104A-104C to deliver the first batch 14.1 of product 12 for the first order 14 to the third sequential parking conveyor 102C. A second batch 14.2 of product 12 for the first order 14 is then loaded on the loading platform 72 at the loading station 70 (which can be done as soon as the first batch 14.1 of product 12 for the first order 14 has left the loading station 70), the controller 20 is signaled with the load switch or the load sensor 84, the controller 20 activates the loading platform drive 82, moving the loading platform 72 into the path of the carrier racks 50 and the first drive 42 is activated to advance the cars 40 along the track 34 such that a second one of the carrier racks 50 passes with the carrier rack fingers 52 between or around the one or more loading platform fingers 74 to pick-up the second batch 14.2 of product 12 for the first order 14. The controller 20 activates the loading platform drive 82 to move the loading platform 72 out of the path of the carrier racks 50, and the controller 20 continues to activate the first drive 42 until at least the second one of the carrier racks 50 is transported to the unloading station 90 at the second location 32B, and the carrier rack fingers 52 pass between or around the one or more powered fingers 92 at the unloading station 90. The controller 20 activates the second drive 98 such that the second batch 14.2 of product 12 for the first order 14 is transported by the one or more powered fingers 92 to the first sequential parking conveyor 102A at the offload and delivery sequencing arrangement 100. The controller 20 activates the first and second sequential parking conveyor drives 104A, 104B to deliver the second batch 14.2 of product 12 for the first order 14 to the second sequential parking conveyor 102B.

If the first order 14 is then complete with the first and second batches 14.1, 14.2 of product 12, the controller 20 activates the second and third sequential parking conveyor drives 104B, 104C to deliver the first order 14 to the present station 110. Here, the present station 110 can include a present mechanism 114 with a present mechanism drive 115 that is connected to the controller 20 and the controller activates the present mechanism drive 115 to deliver the first and second batches 14.1, 14.2 of product 12 for the first order 14 to the customer pickup location 112.

In one arrangement, the method further includes using the order receiving system 120 as described above with the system 10 receiving an order 14 via the order receiving system 120 and the order controller 128 that is configured to receive the orders, and displaying the orders 14 on a display panel 130 connected to the order controller 128 with the orders displaying in a correct sequence.

In one arrangement, the method may further include a user loading the first order 14 or the first said batch 14.1 of product 12 for the first order 14 on the loading platform 72 at the loading station 70 based on the order 14 displayed on the display panel 130, and the user then signaling the controller 20 that the first order 14 or the first said batch 14.1 of product 12 for the first order 14 on the loading platform 72 is complete.

These steps may be repeated for a second order 15 or first and second batches 15.1, 15.2 of product 12 for the second order 15 in a similar manner.

With the system 10 including the bypass delivery system 140, the method may also include use of the bypass delivery system 140 to deliver a second or subsequent batch 14.3 of product 12 for the first order 14 to the present station 110 ahead of the second order 15 or the first said batch 15.1 of product 12 for the second order 15.

Figures 5A, 5B, 5C:
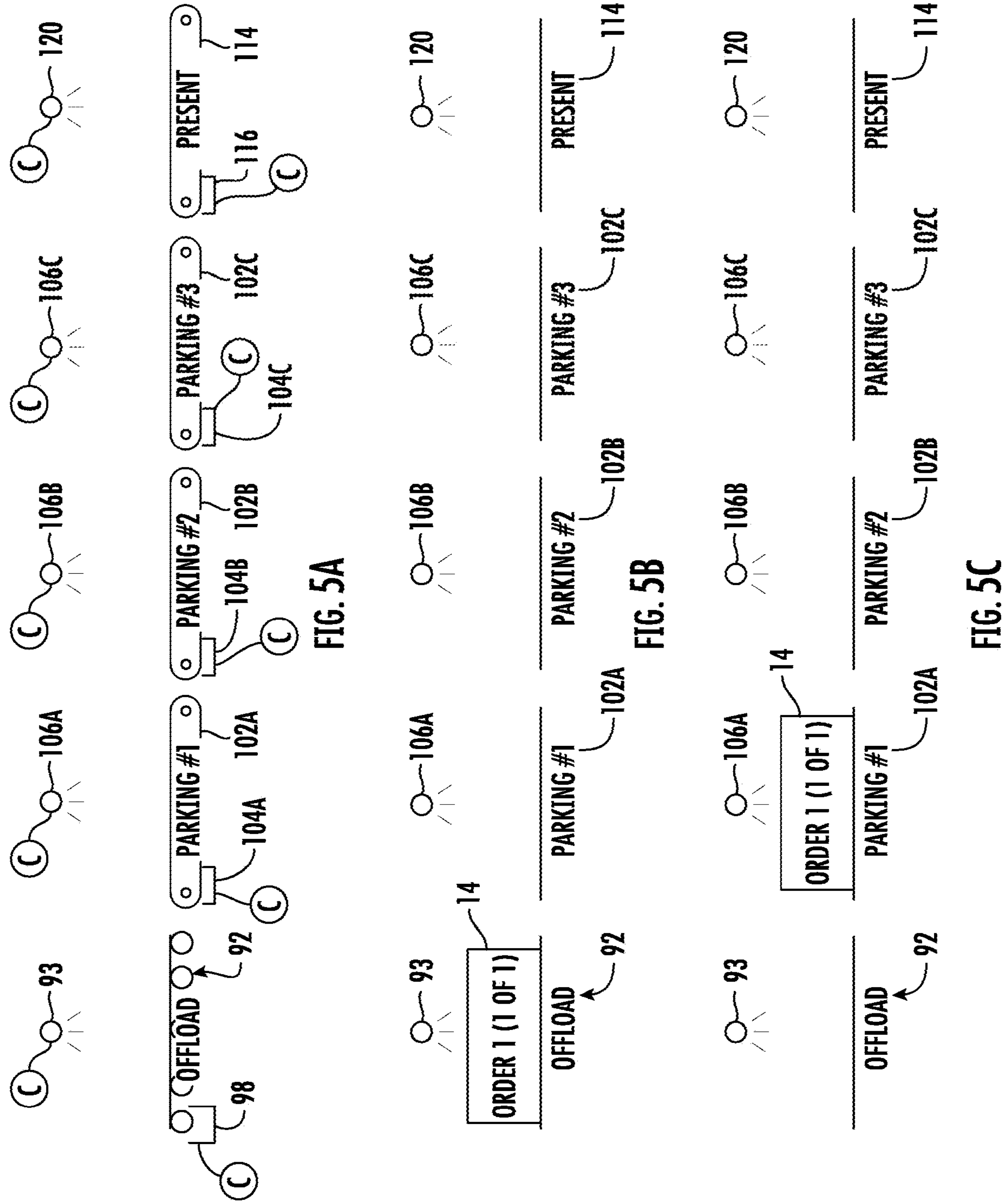
FIGS. 5A-5Y schematically show a sequence of orders that are loaded and queued for delivery using the system in FIG. 1.
Figures 5D, 5E, 5F:
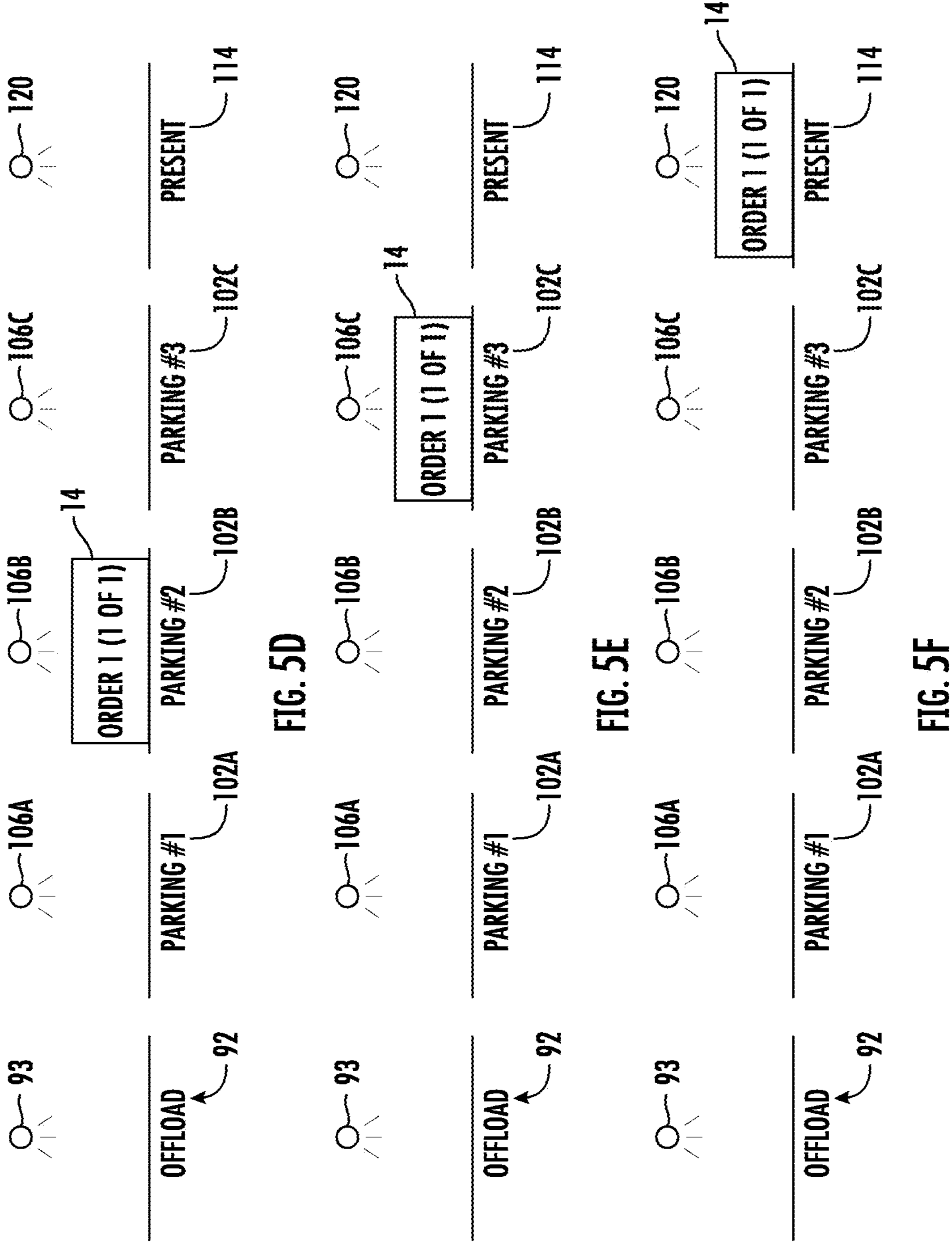
Figures 5G, 5H, 5I:
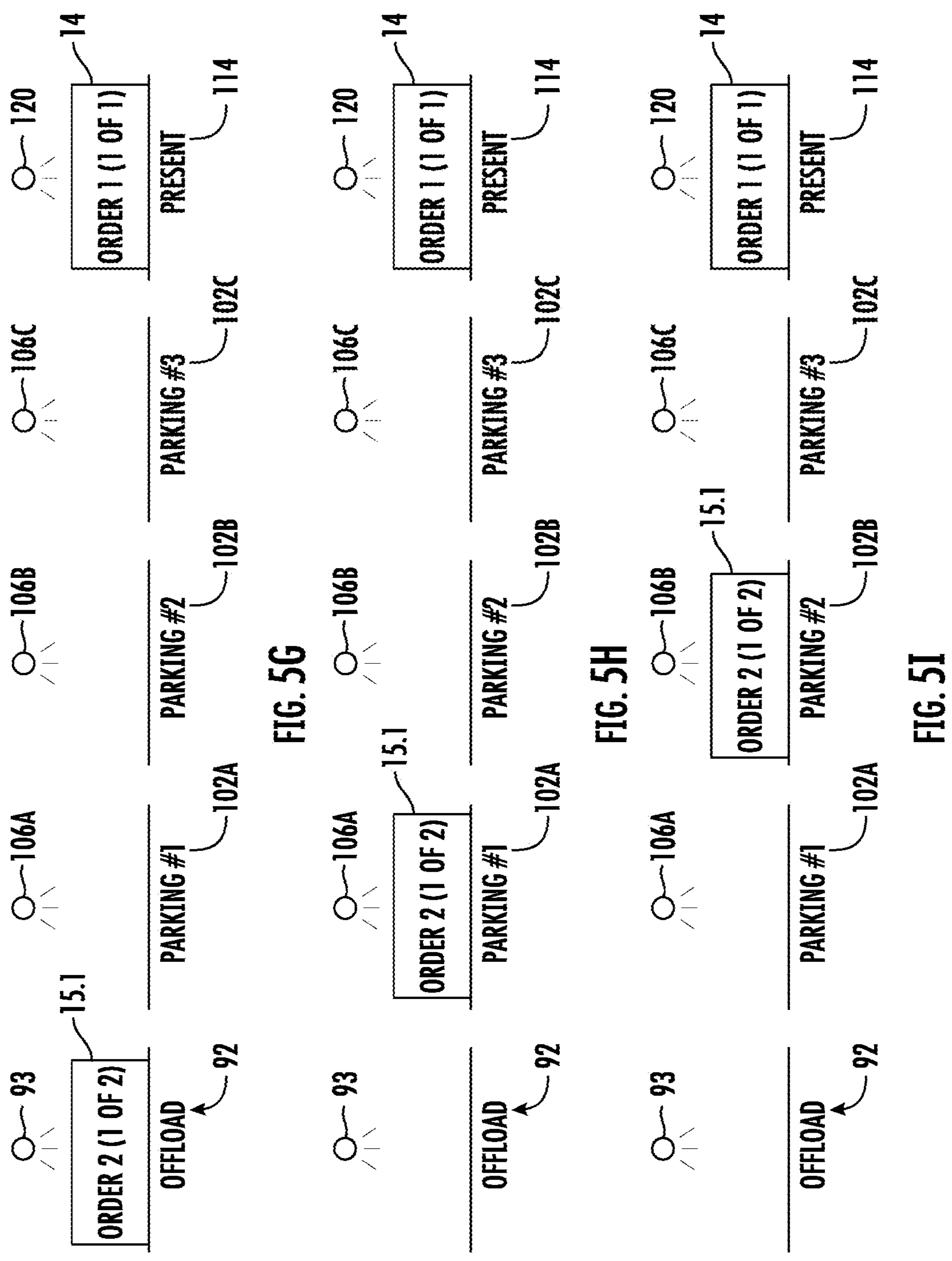
Figures 5J, 5K:
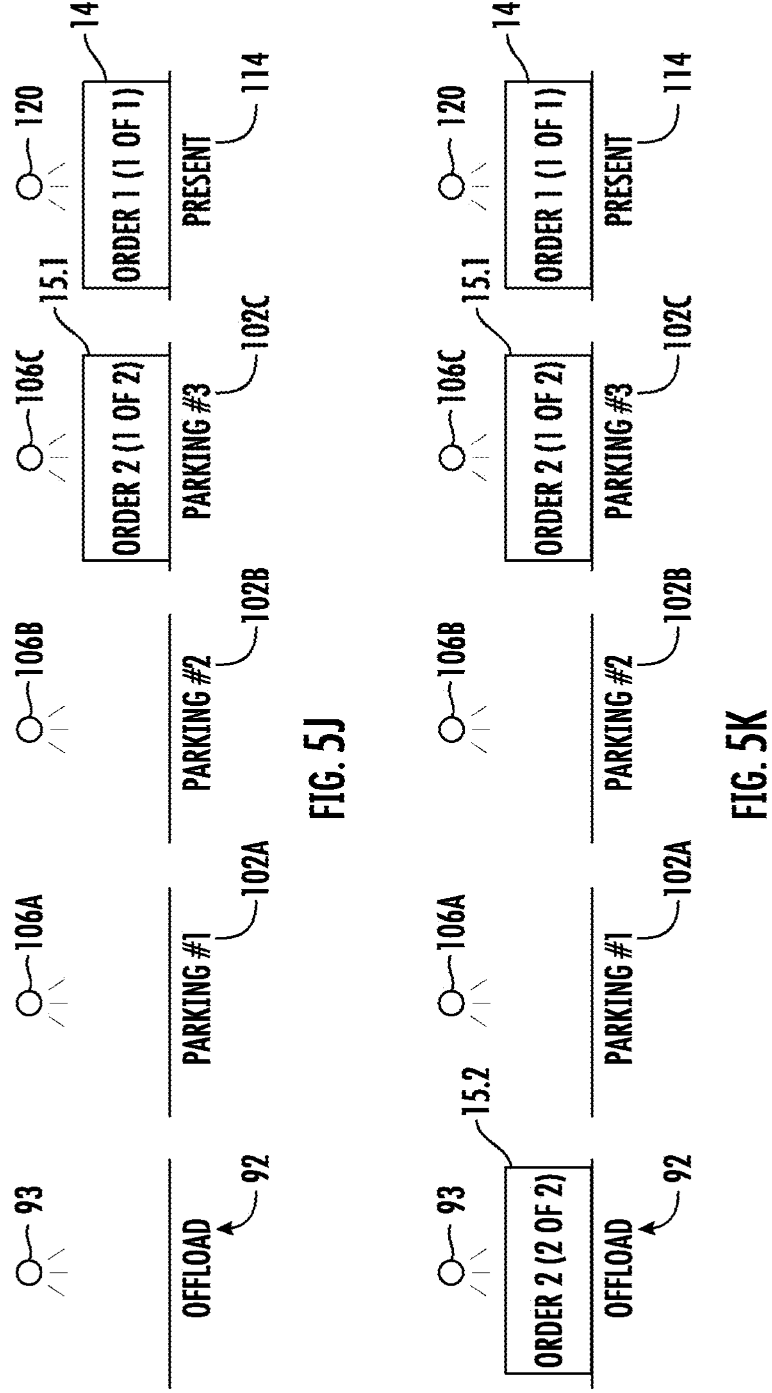
Figures 5L, 5M, 5N:
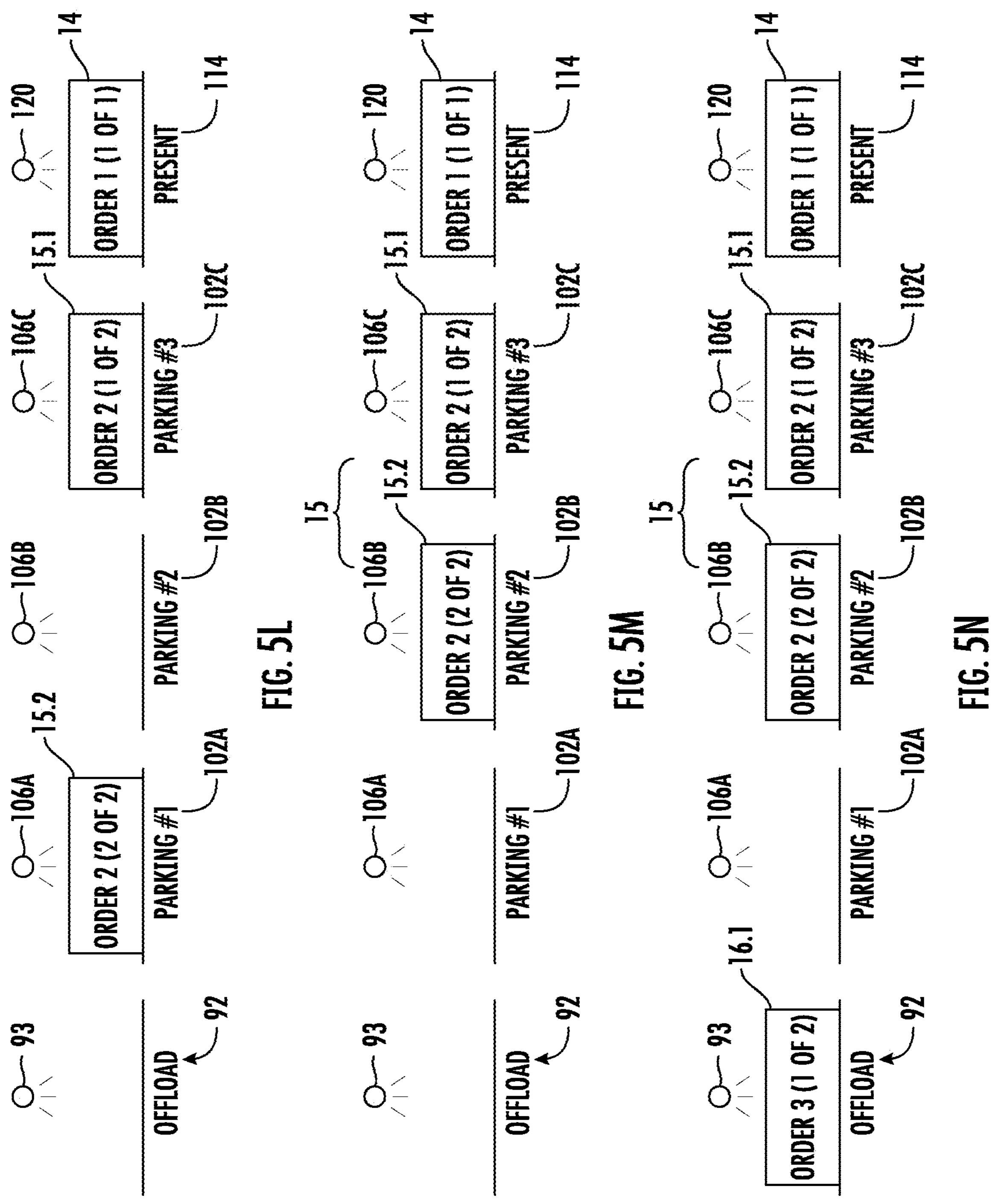
Figures 5O, 5P:
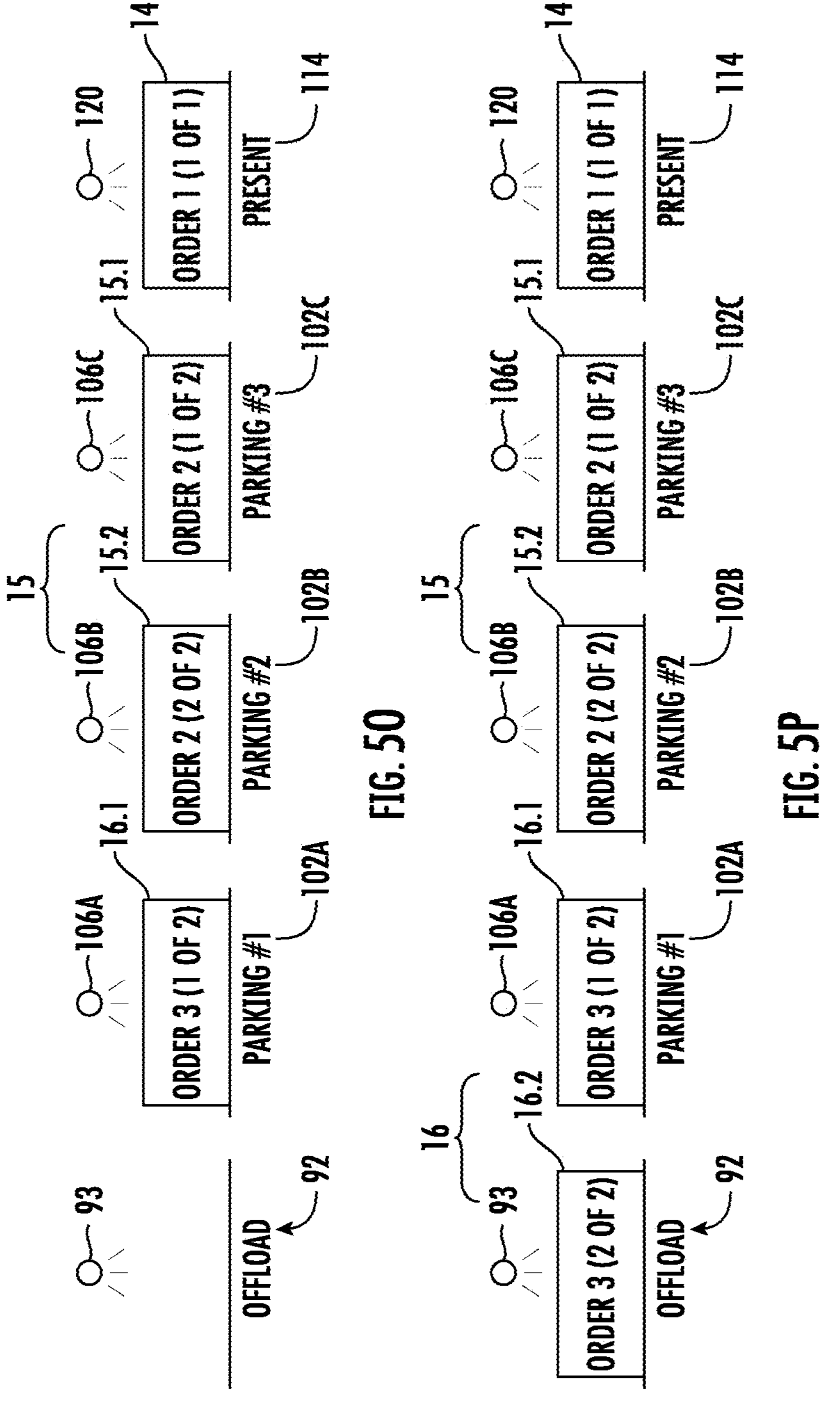
Figures 5Q, 5R, 5S:
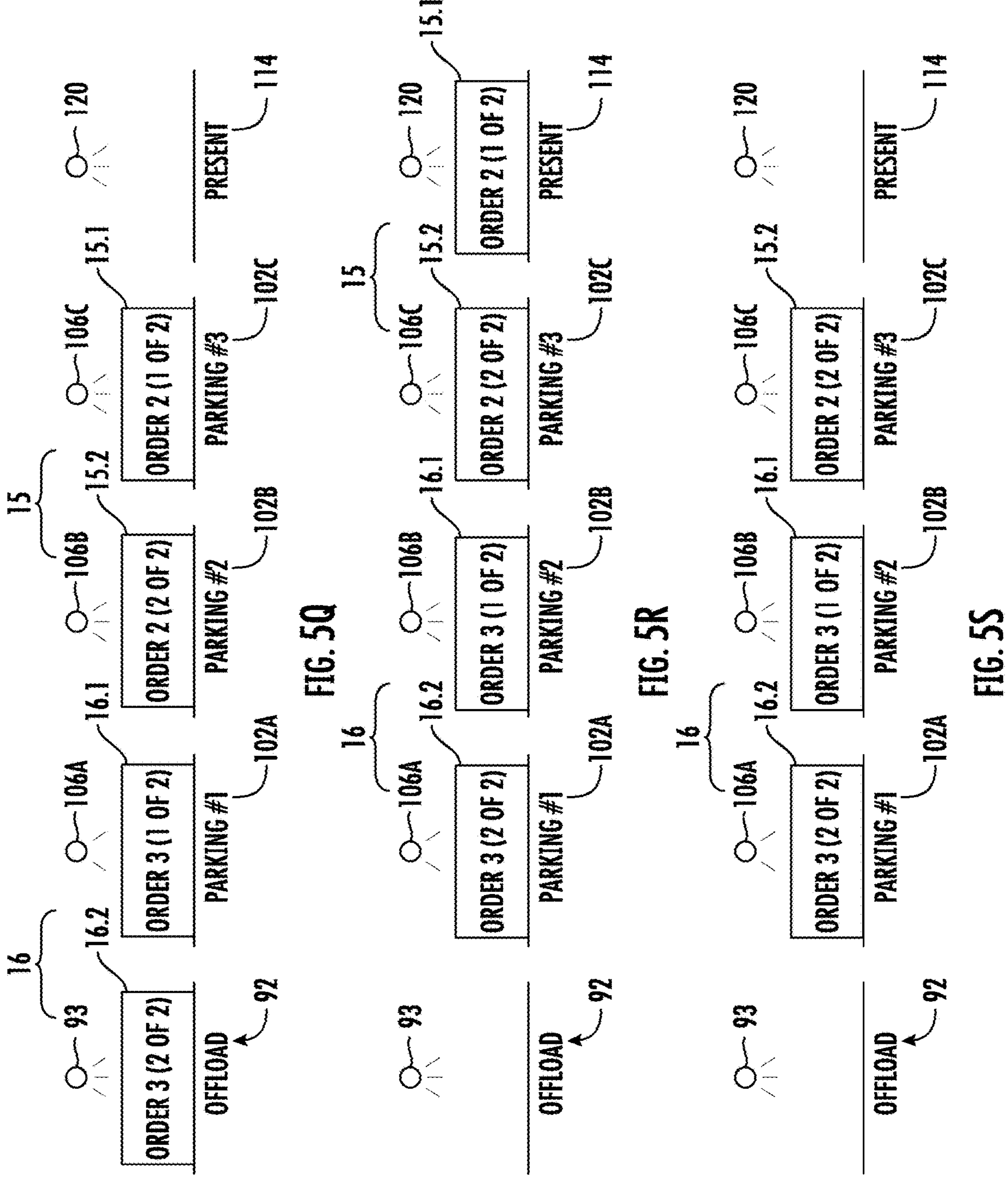
Figures 5T, 5U, 5V:
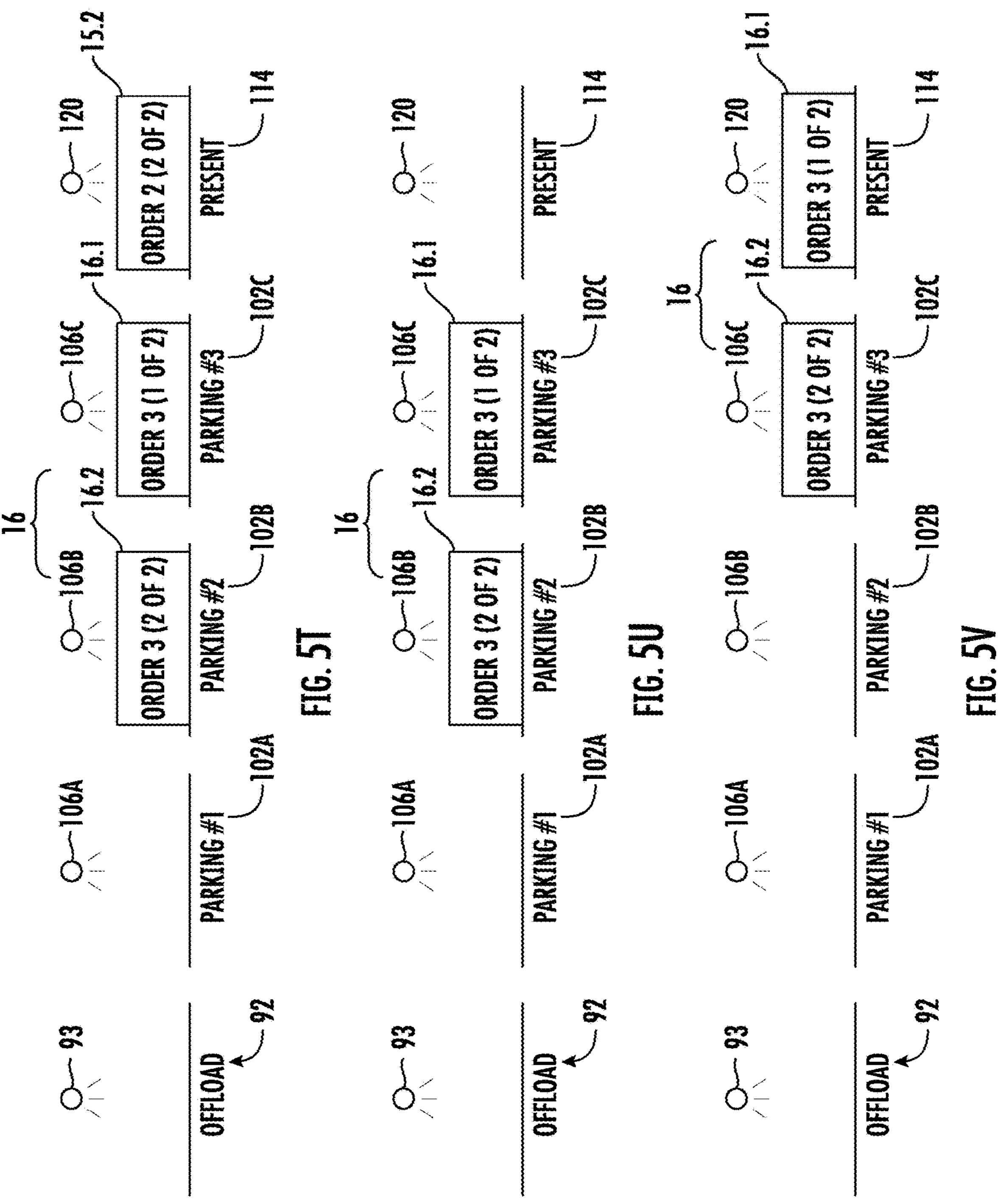
Figures 5W, 5X, 5Y:
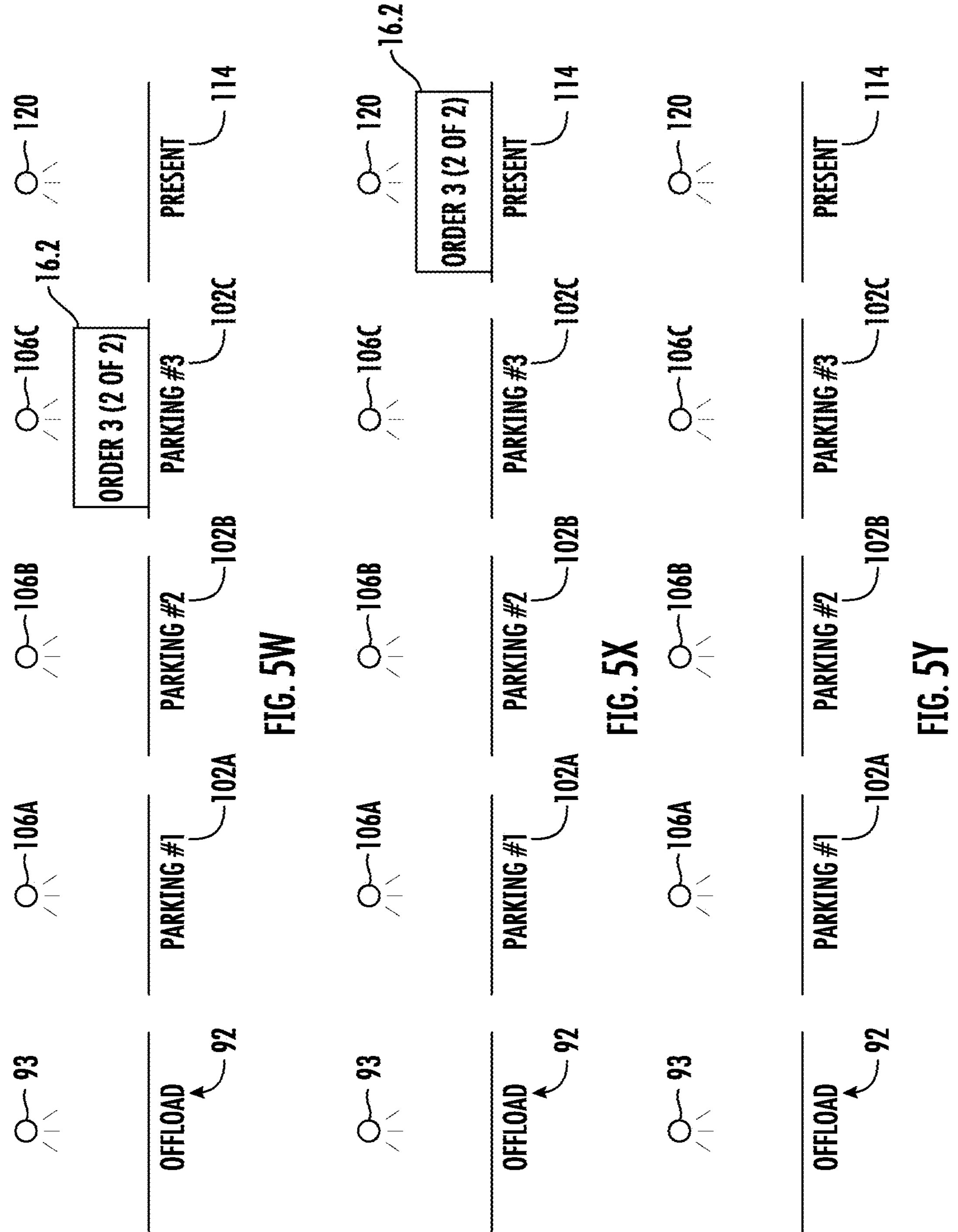

Referring now to FIGS. 5A-5Y, an example scenario is explained in detail with respect to the delivery of orders that are queued on the first, second, and third sequential parking conveyors 102A-102C. For this example a batch, which is all of the product that can be held in one carrier rack 50, is up to 2 bags of the product 12. However, this is exemplary only, and could be changed.

Example Scenario

There are 3 orders: including Order #1 consisting of 2 bags; Order #2 consisting of 4 bags; and Order #3 consists of 3 bags. There are 3 "parking lot" zones on the offload conveyor system define by the first, second, and third sequential parking conveyors 102A-102C. The system 10 is assumed to be empty at the start of this scenario. All 3 orders will be loaded before the 1$^{st}$ order is delivered to the customer.

Based on this scenario, loading of the orders can take place as follows:

Loading Order #1:

Both bags for order #1 are placed onto the load station loading platform 72.

The load station switch or sensor 83 on the loading station 70 is activated to indicate to the controller 20 that a batch of product 12 which is the complete order #1 (14) has been loaded. One of 2 scenarios may occur to indicate to the system that the entire order has been loaded: (a) The crew person presses the load station switch 83 indicating "order complete"; or (b) the system "times out" after a pre-determined duration with no additional product being sensed by a sensor in the load area. Order #1 is then transported onward by the transport arrangement 30.

Order #1 (14) is now "decoupled" from the loading of additional orders, meaning that Order #2 can be loaded while either: (a) Order #1 (14) is in transit to the unloading station 90, (b) Order #1 (14) is sitting at the present station 110 awaiting pickup by the customer, or (c) Order #1 (14) has been picked up by the customer. Here, the transport arrangement 30 may run continuously during the course of normal operation unless the unloading station 90 and off-loading and delivery sequencing arrangement 100 are completely full.

Loading Order #2:

Two of the 4 bags that constitute order #2 (15) are placed onto the load station loading platform 72.

The load station switch or sensor 83 on the loading station 70 is activated to indicate to the controller 20 that a first batch 15.1 of product 12 for Order #2 (15) has been loaded, and the first batch 15.1 of order #2 (15) is transported onward using the transport arrangement 30. The 2 remaining bags that constitute the second batch 15.2 of order #2 (15) are placed onto the load station loading platform 72. The load station switch or sensor 83 on the loading station 70 is activated to indicate to the controller 20 that the second batch 15.2 of product 12 for Order #2 (15) has been loaded. One of the aforementioned scenarios occurs to "close out" the order ((a) The crew person presses the load station switch 83 indicating "order complete"; or (b) the system "times out" after a pre-determined duration with no additional product being sensed by a sensor in the load area). It is also possible to provide an option that if the second batch of bags is loaded after the timeout period elapses, a user can press a further "Merge Order" button to indicate to the controller 20 that the current batch belongs to the previous order.

Loading Order #3:

The steps here for loading order number 3 (16) would be the same as Loading Order #2 (15).

Offloading

The offloading takes place with the three different conveyors: (a) the one or more powered fingers 92 at the offloading station 90; (b) the sequential parking conveyors 102A-102C; and (c) the present mechanism 114. These are schematically shown in FIG. 5A.

Offloading & Queueing Order #1:

As shown in FIG. 5B, the 2 bag "batch" that constitutes Order #1 (14) is deposited onto the powered fingers 92 at the offloading station 90. The sensor 93 at the offloading station 90 detects the presence of product 12 and signals the controller 20. Because there is no product 12 currently on the first sequential parking conveyor 102A, the batch immediately advances onto the first sequential parking conveyor 102A, as shown in FIG. 5C.

The product sensor 106A at the end of the first sequential parking conveyor 102A indicates to the controller 20 that there is now product on the first sequential parking conveyor 102A. Because there is no product currently on the second sequential parking conveyor 102B, the batch (i.e., Order #1 (14)) from the first sequential parking conveyor 102A immediately advances onto the second sequential parking conveyor 102B, as shown on FIG. 5D.

A product sensor 106B at the end of the second sequential parking conveyor 102B indicates to the controller 20 that there is product on the second sequential parking conveyor 102B. Because there is no product currently on the third sequential parking conveyor 102C, the batch (i.e., Order #1 (14)) immediately advances onto the third sequential parking conveyor 102C, as shown on FIG. 5E.

A product sensor 106C at the end of the third or last sequential parking conveyor 102C indicates to the controller 20 that there is product on the third sequential parking conveyor 102C. Because there is no product currently on the present mechanism 114, the batch (i.e., Order #1 (14)) immediately advances onto the present mechanism 114, as shown in FIG. 5F.

A sensor 120 at the end of the present mechanism 114 indicates to the system that there is now product on the present mechanism 114.

Offloading & Queueing Order #2:

The 2 bag first batch 15.1 that constitutes the first half of Order #2 (15) is deposited onto the one or more powered fingers 92 at the offloading station 90, as shown in FIG. 5G.

The sensor 93 at the one or more powered fingers 92 detect the presence of product.

Because there is no product currently on the first sequential parking conveyor 102A, the batch immediately advances onto the first sequential parking conveyor 102A, as shown in FIG. 5H.

The product sensor 106A at the end of the first sequential parking conveyor 102A indicates to the controller 20 that there is now product on the first sequential parking conveyor 102A. Because there is no product currently on the second sequential parking conveyor 102B, the first batch 15.1 of product from the first sequential parking conveyor 102A immediately advances onto the second sequential parking conveyor 102B, as shown in FIG. 5I.

A product sensor 106B at the end of the second sequential parking conveyor 102B indicates to the controller 20 that there is product (first batch 15.1 that constitutes the first half of Order #2 (15)) on the second sequential parking conveyor 102B. Because there is no product currently on the third sequential parking conveyor 102C, the batch immediately advances onto the third sequential parking conveyor 102C, as shown on FIG. 5J.

The product sensor 106C at the end of the third sequential parking conveyor 102C indicates to the controller 20 that there is product (first batch 15.1 that constitutes the first half of Order #2 (15)) on the third sequential parking conveyor 102C. Because there is already product (i.e., Order #1 (14)) on the present mechanism 114, the batch (first batch 15.1 that constitutes the first half of Order #2 (15)) remains on the third sequential parking conveyor 102C.

The 2 bag second batch 15.2 that constitutes the remainder of Order #2 (15) is deposited onto the one or more powered fingers 92 at the offloading station 90, as shown in FIG. 5K.

The sensor 93 at the one or more powered fingers 92 detects the presence of product (the second batch 15.2 that constitutes the second half of Order #2 (15)). Because there is no product currently on the first sequential parking conveyor 102A, the batch immediately advances onto the first sequential parking conveyor 102A, as shown in FIG. 5L.

The proximity sensor 106A at the end of the first sequential parking conveyor 102A indicates to the controller 20 that there is now product (the second batch 15.2 that constitutes the second half of Order #2 (15)) on the first sequential parking conveyor 102A. Because there is no product currently on the second sequential parking conveyor 102B, the batch (the second batch 15.2 that constitutes the second half of Order #2 (15)) from parking the first sequential parking conveyor 102A immediately advances onto the second sequential parking conveyor 102B, as shown in FIG. 5M.

The product sensor 106B at the end of the second sequential parking conveyor 102B indicates to the controller 20 that there is product (the second batch 15.2 that constitutes the second half of Order #2 (15)) on the second sequential parking conveyor 102B. Because there is already product (the first batch 15.1 that constitutes the first half of Order #2 (15)) on the third sequential parking conveyor 102C, the batch (the second batch 15.2 that constitutes the second half of Order #2 (15)) remains on the second sequential parking conveyor 102B.

Offloading & Queueing Order #3:

The 2 bag first batch 16.1 that constitutes the first half of Order #3 (16) is deposited onto the one or more powered fingers 92 at the offloading station 90, as shown in FIG. 5N.

The sensor 93 at the one or more powered fingers 92 detect the presence of product. Because there is no product currently on the first sequential parking conveyor 102A, the batch 16.1 that constitutes the first half of Order #3 (16) immediately advances onto the first sequential parking conveyor 102A, as shown in FIG. 5O.

The product sensor 106A at the end of the first sequential parking conveyor 102A indicates to the controller 20 that there is now product (batch 16.1 that constitutes the first half of Order #3 (16)) on the first sequential parking conveyor 102A.

Because there is already product (batch 15.2 that constitutes the second half of Order #2 (15)) on the second sequential parking conveyor 102B, the batch 16.1 that constitutes the first half of Order #3 (16) remains on parking conveyor #1.

The single bag which is the second batch 16.2 that constitutes the remainder of Order #3 (16) is deposited onto the one or more powered fingers 92 at the offloading station 90, as shown in FIG. 5P.

Because there is already product (the batch 16.1 that constitutes the first half of Order #3 (16)) on the first sequential parking conveyor 102A, the batch remains on the one or more powered fingers 92 at the offload station 90. Because there is product on the one or more powered fingers 92 that is unable to advance, the transport arrangement 30 immediately comes to a stop.

Delivery

Delivery of Order #1:

Order #1 (14) is delivered to the customer from the present mechanism 114, as shown in FIG. 5Q. This can be detected by product sensor 120 which signals the controller 20 that the present mechanism 114 no longer holds any product.

All upstream batches 15.1, 15.2, 16.1 and 16.2 advance position by the controller 20 activating the one or more powered fingers 92, the sequential parking conveyors 1202A-102C, and the present mechanism 114, such that the one or more powered fingers 92 at the offload station 90 are unoccupied, as shown in FIG. 5R. The transport arrangement 30 is allowed to resume.

The controller 20 knows that Order #1 (14) consisted of a single batch, so no additional product is presented to the customer of Order #1 (14).

Delivery of Order #2:

The first batch 15.1 of order #2 (15) is delivered to the customer, as shown in FIG. 5S. All upstream batches advance position by the controller 20 activating the sequential parking conveyors 102A-102C, and the present mechanism 114, as shown in FIG. 5T.

The controller 20 knows that order #2 (15) consists of first and second batches 15.1 and 15.2, so the second batch 15.2 of order #2 (15) is also delivered to the customer, thus completing the order #2 (15), as shown in FIG. 5U.

All upstream batches advance position by the controller 20 activating the second and third sequential parking conveyors 102B, 102C, and the present mechanism 114, as shown in FIG. 5V.

Delivery of Order #3:

The first batch 16.1 of order #3 (16) is delivered to the customer, as shown in FIG. 5W.

All upstream batches advance position, by the controller 20 activating the third sequential parking conveyors 102C and the present mechanism 114, as shown in FIG. 5X.

The controller 20 knows that order #3 (16) consisted of 2 batches 16.1, 16.2, so the second batch 16.2 of order #3 (16) is also delivered to the customer, thus completing the order, as shown in FIG. 5Y.

The above example is merely exemplary, and those skilled in the art will recognize that the system 10 can simultaneously handle product loading at the loading station 70 to fill orders, while at the same time delivering orders at the present mechanism 114. This allows for a continuous flow of orders to a remote customer pick-up location 112. Additionally, the delivery bypass system 140 allows missing pieces of orders to be advanced "out of turn" into the proper order at the present station 110.

Figure 12:
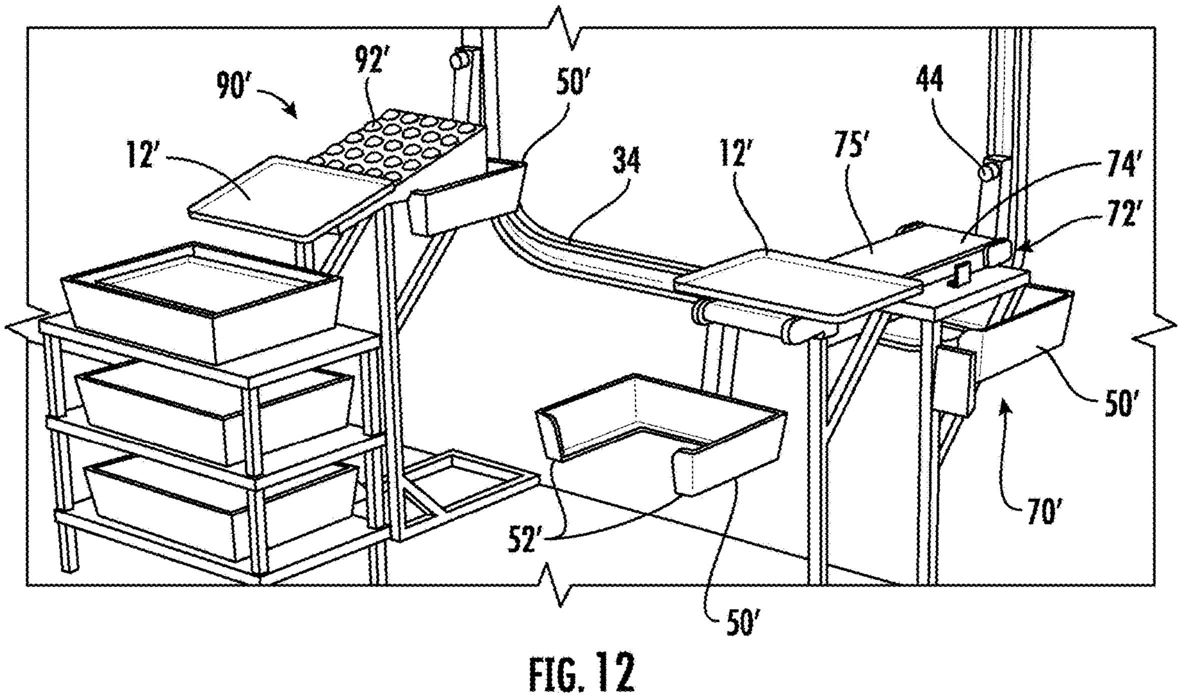
FIG. 12 is a perspective view of a further embodiment of a system for loading, queuing, and delivery of orders in accordance with the disclosure

Referring to FIG. 12, a further embodiment of the system 10' is shown. In this embodiment, the carrier rack 50' is shown that includes two generally horizontally extending carrier rack fingers 52', that are adapted for engaging a tray 12'. The loading station 70' includes a loading platform 72' comprising a single horizontal loading platform finger 74', which in this embodiment is formed as a conveyor belt 75'. Here, the unloading station 90' includes a single finger 92' formed as a ramp surface for unloading the trays 12' from the carrier rack 50'. Alternatively, the finger 92' could be provided as a powered belt similar to the conveyor belt 75' at the loading station 70', It will be appreciated that the foregoing is presented by way of illustration only and not by way of any limitation. It is contemplated that various alternatives and modifications may be made to the described embodiments without departing from the spirit and scope of the invention. Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A system for loading, queueing, and delivery of orders, the system comprising:

a controller;

a transport arrangement, including:

a pathway defined by a track;

a plurality of cars that move along the pathway, the cars being connected to a first drive, the first drive being connected to the controller to selectively activate the first drive to advance the cars along the pathway;

at least some of the cars having a carrier rack pivotably connected thereto, the carrier rack being adapted to support a product to be transported as the carrier travels along the pathway, the carrier rack including a plurality of generally horizontally extending carrier rack fingers;

a loading station including a loading platform at least at a first location along the pathway configured to receive one or more batches of product for each order, the loading platform comprises one or more, generally horizontal loading platform fingers, with the one or more loading platform fingers being adapted to pass between the carrier rack fingers when the loading platform is in the path of the carrier rack;

at least one of a load switch or load station sensor configured to signal the controller after a first said batch of product for a first said order has been loaded on the loading platform, the controller being configured to activate the first drive to advance the cars such that the first batch of product is lifted by the carrier rack attached to a first said car to advance the first batch of product for the first order to an unloading station located remote from the loading station;

the unloading station including one or more powered fingers at least at a second location along the pathway, the one or more powered fingers are arranged to be located between the carrier rack fingers when the carrier rack passes through the second location, and a second drive connected to the one or more powered fingers, the second drive being connected to the controller to selectively drive the one or more powered fingers;

an offload and delivery sequencing arrangement including:

at least one parking conveyor arranged to receive the batches of product from the one or more powered fingers;

at least one sequential parking conveyor drive associated with the at least one sequential parking conveyor, the at least one sequential parking conveyor drive being connected to the controller to selectively drive the at least one sequential parking conveyor; and a present station configured to receive the batches of product from the at least one sequential parking conveyor and deliver the batches of product to a customer pick-up location.

2. The system of claim 1, wherein the present station includes a present mechanism arranged downstream from the at least one sequential parking conveyor and a present mechanism drive connected to the controller to selectively drive the present mechanism.

3. The system of claim 1, wherein the present station includes a movable surface.

4. The system of claim 3, further comprising a product sensor configured to sense a presence of the products on the movable surface.

5. The system of claim 1, further comprising:

an order receiving system including at least one of an intercom, QR code reader, or touch screen;

an order controller configured to receive orders; and a display panel connected to the order controller that is configured to show the orders to users with a correct order sequence.

6. The system of claim 1, wherein the loading platform is mounted for movement into and out of a path of the carrier racks via a loading platform drive that is connected to the controller, and the controller is configured to activate the loading platform drive to move the loading platform into the path of the carrier rack.

7. The system of claim 1, wherein the one or more powered fingers comprise a plurality of rollers arranged cantilevered from a roller support, and the plurality of rollers are arranged to be located between the carrier rack fingers when the carrier rack passes through the second location.

8. The system of claim 1, wherein the one or more powered fingers comprise at least one conveyor belt or chain.

9. The system of claim 1, wherein the at least one sequential parking conveyor includes at least first, second, and third sequential parking conveyors, the first sequential parking conveyor being arranged to receive the batches of product from the one or more powered fingers, the second sequential parking conveyor being arranged to receive the batches of product from the first sequential parking conveyor, and the third sequential parking conveyor being arranged to receive the batches of product from the second sequential parking conveyor, and the at least one sequential parking conveyor drive includes first, second and third sequential parking conveyor drives associated with respective ones of the first, second, and third sequential parking conveyors, the first, second and third sequential parking conveyor drives being connected to the controller to selectively drive the first, second, and third sequential parking conveyors.

10. The system of claim 1, further comprising:

a delivery bypass system including one or more powered bypass fingers at least at a third location along the pathway, the one or more powered bypass fingers extend generally horizontally and are arranged to be located between the carrier rack fingers when the carrier rack passes the third location on the pathway, a bypass drive connected to the one or more powered bypass fingers, the bypass drive being connected to the controller to selectively drive the one or more powered bypass fingers, a movable bypass finger support drive connected to the controller to selectively move the one or more powered bypass fingers in a generally horizontal direction from a first, inactive position, out of a path of the carriage rack, into a second, active position, in the path of the carriage rack;

a bypass offload conveyor located adjacent to the one or more powered bypass fingers in the second, active position, and a bypass offload conveyor drive connected to the controller to selectively drive the bypass offload conveyor; and a bypass delivery arrangement configured to move one of the batches of product from the bypass offload conveyor downstream of the at least one sequential parking conveyor to the present station.

11. The system of claim 9, wherein the one or more powered bypass fingers comprise a second plurality of rollers arranged cantilevered from a movable bypass finger support.

12. The system of claim 9, wherein the bypass delivery arrangement includes a first plurality of powered transfer rollers arranged cantilevered from a transfer roller support, the transfer roller support being supported for generally vertical movement between a first, receiving position adjacent to a delivery end of the bypass offload conveyor, and a second, bypass delivery position downstream of the at least one sequential parking conveyor.

13. The system of claim 11, further comprising:

a second plurality of powered transfer rollers or belts arranged at the second, bypass delivery position, the second plurality of powered transfer rollers or belts being arranged to be in positions between the first plurality of powered transfer rollers when the transfer roller support is in the second, bypass delivery position; and a second powered transfer roller drive connected to the controller to selectively activate the second plurality of powered transfer rollers or belts.

14. The system of claim 1, further comprising at least one product sensor associated with each of the at least one sequential parking conveyor.

15. A method for loading, queueing, and delivery of orders using a system for loading, queueing, and delivery of orders, the method comprising:

providing the system for loading, queueing, and delivery of orders, which comprises: a controller; a transport arrangement, including: a pathway defined by a track; a plurality of cars that move along the pathway, the cars being connected to a first drive, the first drive being connected to the controller to selectively activate the first drive to advance the cars along the pathway; at least some of the cars having a carrier rack pivotably connected thereto, the carrier rack being adapted to support a product to be transported as the carrier travels along the pathway, the carrier rack including a plurality of generally horizontally extending carrier rack fingers; a loading station including a loading platform at least at a first location along the pathway configured to receive one or more batches of product for each order, the loading platform comprises one or more, generally horizontal loading platform fingers, with the one or more loading platform fingers being adapted to pass between the carrier rack fingers when the loading platform is in the path of the carrier rack; at least one of a load switch or load station sensor configured to signal the controller after a first said batch of product for a first said order has been loaded on the loading platform, the controller being configured to activate the first drive to advance the cars such that the first batch of product is lifted by the carrier rack attached to a first said car to advance the first batch of product for the first order to an unloading station located remote from the loading station; the unloading station including one or more powered fingers at least at a second location along the pathway, the one or more powered fingers are arranged to be located between the carrier rack fingers when the carrier rack passes through the second location, and a second drive connected to the one or more powered fingers, the second drive being connected to the controller to selectively drive the one or more powered fingers; an offload and delivery sequencing arrangement including: at least one parking conveyor arranged to receive the batches of product from the one or more powered fingers; at least one sequential parking conveyor drive associated with the at least one sequential parking conveyor, the at least one sequential parking conveyor drive being connected to the controller to selectively drive the at least one sequential parking conveyor; and a present station configured to receive the batches of product from the at least one sequential parking conveyor and deliver the batches of product to a customer pick-up location;

loading the first order or a first said batch of product for the first order on the loading platform at the loading station;

signaling the controller with the load switch or load station sensor;

the controller activating the first drive to advance the cars along the track such that a first one of the carrier racks passes with the carrier rack fingers between or around the one or more loading platform fingers to pick-up the first order or the first said batch of product for the first order;

the controller continuing to activate the first drive at least until the first one of the carrier racks is transported to the unloading station, and the carrier rack fingers pass between or around the one or more powered fingers at the unloading station; and the controller activating the second drive such that the first order or the first said batch of product for the first order is transported by the one or more powered fingers to the at least one sequential parking conveyor at the offload and delivery sequencing arrangement.

16. The method of claim 15, wherein the loading platform is mounted for movement into and out of a path of the carrier racks via a loading platform drive that is connected to the controller, and the controller is configured to activate the loading platform drive to move the loading platform into the path of the carrier rack, and the method further comprises the controller activating the loading platform drive, moving the loading platform into the path of the carrier racks, and the controller activating the loading platform drive to move the loading platform out of the path of the carrier racks.

17. The method of claim 15, wherein the first order or the first said batch of product for the first order is the first order, and the method further comprising:

the controller activating the at least one sequential parking conveyor drive to deliver the first order to the present mechanism.

18. The method of claim 15, wherein the at least one sequential parking conveyor includes at least first, second, and third sequential parking conveyors, the first sequential parking conveyor being arranged to receive the batches of product from the one or more powered fingers, the second sequential parking conveyor being arranged to receive the batches of product from the first sequential parking conveyor, and the third sequential parking conveyor being arranged to receive the batches of product from the second sequential parking conveyor, and the at least one sequential parking conveyor drive includes first, second and third sequential parking conveyor drives associated with respective ones of the first, second, and third sequential parking conveyors, the first, second and third sequential parking conveyor drives being connected to the controller to selectively drive the first, second, and third sequential parking conveyors, and the method further comprises:

the first order or the first said batch of product for the first order is the first said batch of product for the first order, and the method further comprising:

the controller activating the first, the second and the third sequential parking conveyor drives to deliver the first said batch of product for the first order to the third sequential parking conveyor;

loading a second said batch of product for the first order on the loading platform at the loading station;

signaling the controller with the load switch or load station sensor;

the controller activating the first drive to advance the cars along the track such that a second one of the carrier racks passes with the carrier rack fingers between or around the one or more loading platform fingers to pick-up the second said batch of product for the first order;

the controller continuing to activate the first drive at least until the second one of the carrier racks is transported to the unloading station, and the carrier rack fingers pass between or around the one or more powered fingers at the unloading station;

the controller activating the second drive such that the second said batch of product for the first order is transported by the one or more powered fingers to the first sequential parking conveyor at the offload and delivery sequencing arrangement; and the controller activating the first and the second sequential parking conveyor drives to deliver the second said batch of product for the first order to the second sequential parking conveyor.

19. The method of claim 18, further comprising:

if the first order is complete with the first and second said batches of product, the controller activating the second and the third sequential parking conveyor drives to deliver the first order to the present mechanism.

20. The method of claim 15, further comprising:

providing an order receiving system including at least one of an intercom, QR code reader, or touch screen;

the system receiving an order via the order receiving system and signaling an order controller configured to receive the orders; and displaying the orders on a display panel connected to the order with the orders displayed in a correct order sequence.

21. The method of claim 20, further comprising:

a user loading the first order or the first said batch of product for the first order on the loading platform at the loading station based on the order displayed on the display panel; and a user signaling the controller that the first order or the first said batch of product for the first order on the loading platform is complete.

22. The method of claim 15, further comprising:

repeating the method for a second order or a first said batch of product for the second order.

23. The method of claim 22, further comprising:

providing a delivery bypass system including, one or more powered bypass fingers at least at a third location along the pathway, the one or more powered bypass fingers extend generally horizontally and are arranged to be located between the carrier rack fingers when the carrier rack passes the third location on the pathway, a bypass drive connected to the one or more powered bypass fingers, the bypass drive being connected to the controller to selectively drive the one or more powered bypass fingers, a movable bypass finger support drive connected to the controller to selectively move the powered bypass fingers in a generally horizontal direction from a first, inactive position, out of a path of the carriage rack, into a second, active position, in the path of the carriage rack, a bypass offload conveyor located adjacent to the one or more powered bypass fingers in the second, active position, and a bypass offload conveyor drive connected to the controller to selectively drive the bypass offload conveyor, and a bypass delivery arrangement configured to move one of the batches of product from the bypass offload conveyor downstream of the at least one sequential parking conveyor to the present station; and using the bypass delivery system to deliver a second or subsequent batch of the first order to the present mechanism ahead of the second order or the first said batch of product for the second order.

24. A delivery bypass system for use with an order system for loading, queueing, and delivery of orders, the powered bypass system comprising:

one or more powered bypass fingers configured to be located at a location along a pathway of the order system, the one or more powered bypass fingers extend generally horizontally and are configured to be located between carrier rack fingers of a carrier rack of the order system that pass the location on the pathway, a bypass drive connected to the one or more powered bypass fingers, the bypass drive being configured for connection to a controller of the order system to selectively drive the one or more powered bypass fingers, a movable bypass finger support drive configured to be connected to the controller to selectively move the one or more powered bypass fingers in a generally horizontal direction from a first, inactive position, adapted to be out of a path of the carriage rack, into a second, active position, adapted to be in the path of the carriage rack;

a bypass offload conveyor located adjacent to the one or more powered bypass fingers in the second, active position, and a bypass offload conveyor drive connected to the controller to selectively drive the bypass offload conveyor; and a bypass delivery arrangement configured to move one of the batches of product from the bypass offload conveyor downstream of at least one sequential parking conveyor and/or to a present station of the delivery system.

* * * * *